(12) United States Patent
Sekine

(10) Patent No.: US 7,653,310 B2
(45) Date of Patent: Jan. 26, 2010

(54) WAVELENGTH DIVISION MULTIPLEX (WDM) TRANSMISSION SYSTEM

(75) Inventor: Kenro Sekine, Fuchu (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 536 days.

(21) Appl. No.: 11/657,004

(22) Filed: Jan. 24, 2007

(65) Prior Publication Data

US 2007/0177877 A1  Aug. 2, 2007

(30) Foreign Application Priority Data

Jan. 30, 2006  (JP) .............................. 2006-020529

(51) Int. Cl.
*H04B 10/12* (2006.01)
*H04B 10/18* (2006.01)

(52) U.S. Cl. .............................. 398/81; 398/79; 398/43; 398/147; 398/148; 398/209; 398/158; 398/159; 398/155; 398/162; 398/202; 385/27; 385/123; 385/11; 385/15; 385/37; 385/147

(58) Field of Classification Search .................. 398/81, 398/79, 43, 147, 148, 209, 158, 159, 155, 398/162, 202; 385/11, 15, 37, 123, 147, 385/27

See application file for complete search history.

(56) References Cited

U.S. PATENT DOCUMENTS 6,320,687 B1 * 11/2001 Ishikawa .................... 398/147

(Continued)

FOREIGN PATENT DOCUMENTS

JP  2000-244394  2/2000

OTHER PUBLICATIONS

M. Shirasaki et al., "Compensation of Chromatic Dispersion and Dispersion Slope Using a Virtually Imaged Phased Array", Optical Fiber Communication Conference and Exhibit, Mar. 17-22, 2001, 5 pages.

(Continued)

*Primary Examiner*—Ken N Vanderpuye
*Assistant Examiner*—Amine Benlagsir
(74) *Attorney, Agent, or Firm*—Stites & Harbison PLLC; Juan Carlos A. Marquez, Esq.

(57) ABSTRACT

A low-cost configuration of, and at the same time to control the variable dispersion compensator at a high speed in a variable dispersion compensator for compensating the wavelength dependent accumulated dispersion resulting from the wavelength dependency of the transmission fiber and fixed dispersion compensator in a long-distance high-speed WDM transmission system. In order to achieve the object mentioned above, the wavelength dependent representative characteristic of the transmission fibers 4-1 . . . n, and the wavelength dependent representative characteristic of the DCFs 13-1 . . . n are recorded and maintained in advance in the dispersion control circuit 5-1 . . . n of the variable dispersion compensator 16, and based on the input of dispersion amount at the representative length of the transmission fiber and the fiber length, the dispersion amount at the representative wavelength of the DCF, the accumulated dispersion amount is computed from the wavelength dependent representative characteristic recorded and maintained in advance, and the dispersion amount of the variable dispersion compensator 16 is determined by taking this as the reference.

12 Claims, 16 Drawing Sheets

U.S. PATENT DOCUMENTS

| | | |
|---|---|---|
| 6,501,580 B1 * | 12/2002 | Ishikawa et al. ............. 398/148 |
| 6,925,262 B2 * | 8/2005 | Ooi et al. ..................... 398/147 |
| 7,289,740 B1 * | 10/2007 | Brindel et al. .............. 398/175 |
| 7,308,211 B2 * | 12/2007 | Miyazaki ..................... 398/208 |
| 7,319,821 B2 * | 1/2008 | Sakata et al. ................ 398/147 |
| 7,336,899 B2 * | 2/2008 | Lenz et al. .................... 398/29 |
| 7,340,187 B2 * | 3/2008 | Takeshita .................... 398/209 |
| 7,366,422 B2 * | 4/2008 | Sekiya et al. ............... 398/147 |
| 7,418,206 B2 * | 8/2008 | Kawahata .................... 398/81 |
| 7,450,856 B2 * | 11/2008 | Yoshimoto et al. .......... 398/159 |

OTHER PUBLICATIONS

R. I. Laming et al., "A Dispersion Tunable Grating in a 10-Gb/s 100-220-km-Step Index Fiber Link", IEEE Photonics Technology Letters, vol. 8, No. 3, Mar. 1996, pp. 428-430.

M. Shirasaki et al., "Compensation of Chromatic Dispersion and Dispersion Slope Using a Virtually Imaged Phased Array", 3 pages.

* cited by examiner

FIG. 2
| WAVELENGTH# | $\lambda 1$ | $\lambda 2$ | $\lambda 3$ | ... | $\lambda n$ | ... | $\lambda N$ |
|---|---|---|---|---|---|---|---|
| DISPERSION CONTROL SIGNAL | V1 | V2 | V3 | ... | Vn | ... | VN |
FIG. 3
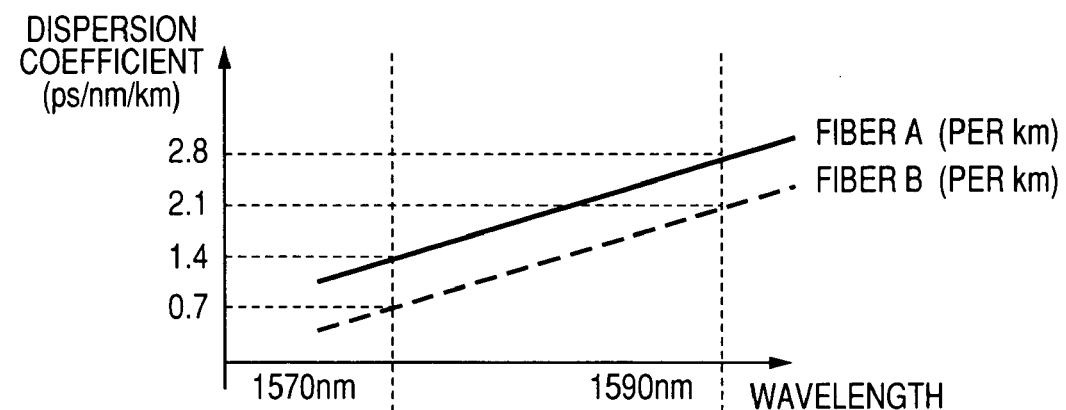
(a) EXAMPLES OF DISPERSION COEFFICIENT CHARACTERISTIC
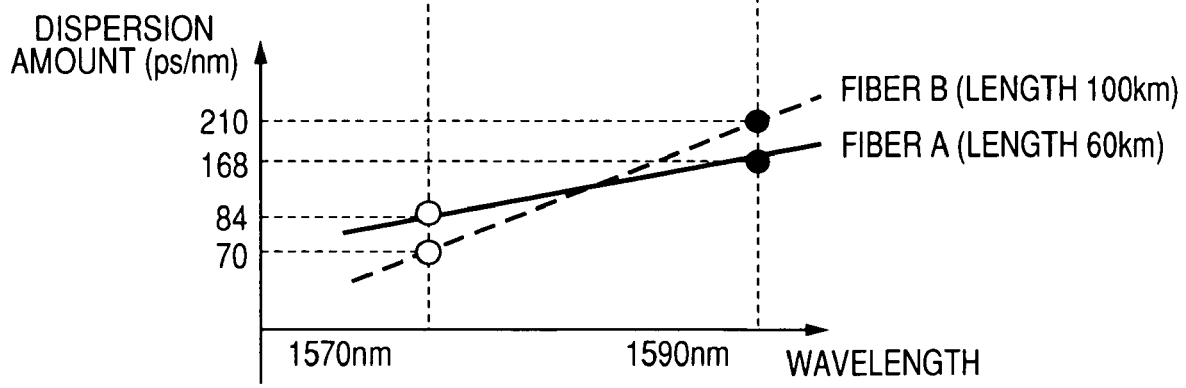
(b) EXAMPLES OF DISPERSION AMOUNT CHARACTERISTICS

FIG. 4
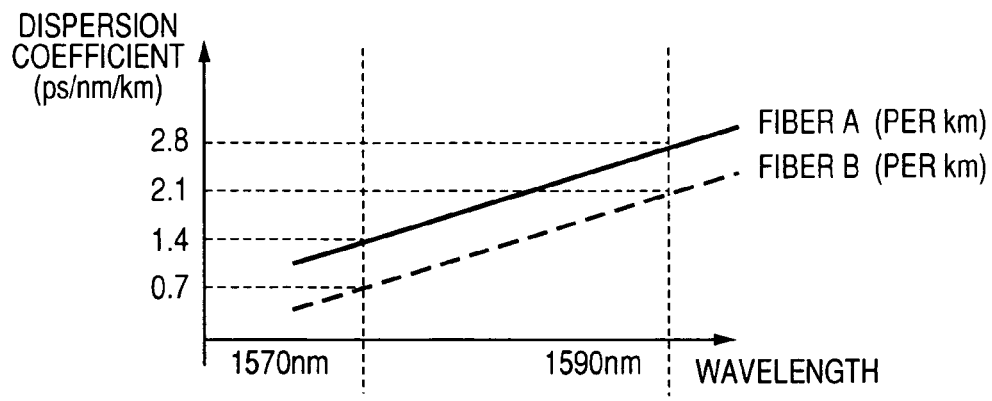
(a) EXAMPLE OF DISPERSION COEFFICIENT CHARACTERISTICS
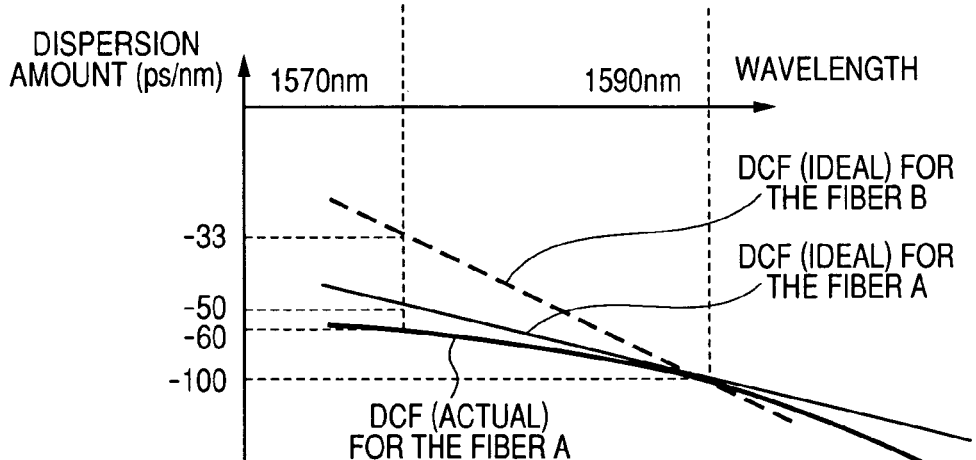
(b) EXAMPLES OF DISPERSION AMOUNT CHARACTERISTICS
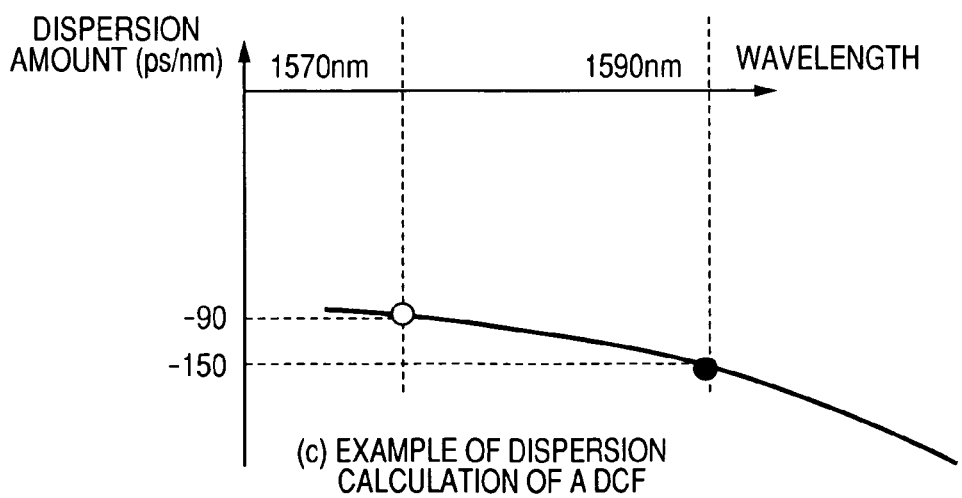
(c) EXAMPLE OF DISPERSION CALCULATION OF A DCF

FIG. 6

| DISPERSION SLOPE VALUE | 0.07(ps/nm²/km) |
|---|---|

(a) EXAMPLE OF THE DISPERSION DATA TABLE OF A TRANSMISSION LINE

| WAVELENGTH # | | λ1 | λ2 | λ3 | ... | λ24 | λx | λ25 | ... | λ46 | λ47 |
|---|---|---|---|---|---|---|---|---|---|---|---|
| WAVELENGTH (nm) | | 1570.42 | 1571.24 | 1572.06 | ... | 1589.57 | 1590.00 | 1590.41 | ... | 1608.33 | 1609.19 |
| DISPERSION AMOUNT (ps/nm) | type1 | -60.6 | -61.9 | -63.2 | ... | -98.9 | -100.0 | -101.0 | ... | -154.2 | -157.2 |
| | type2 | ... | | | | | | | | | |

(b) EXAMPLE OF DISPERSION DATA TABLE OF A FIXED DISPERSION COMPENSATOR

FIG. 10
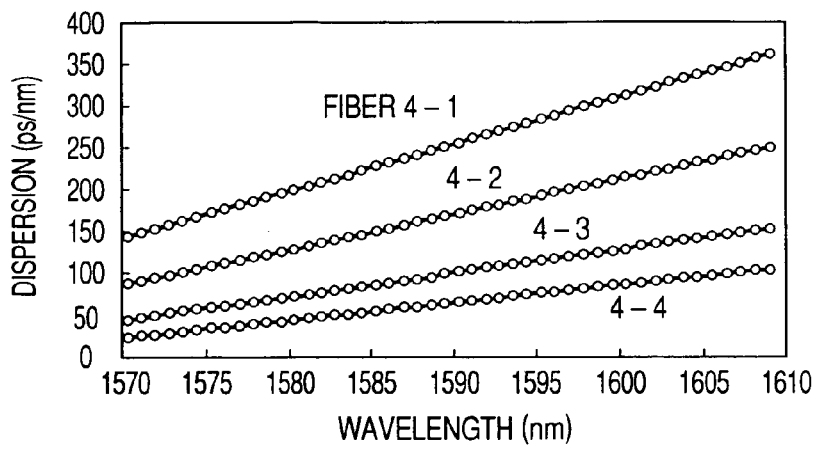
(1) DISPERSION IN THE FIBER
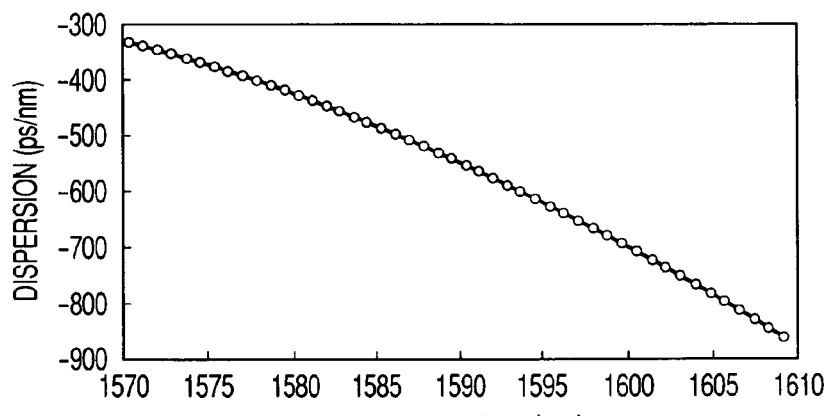
(2) DISPERSION IN THE DCF
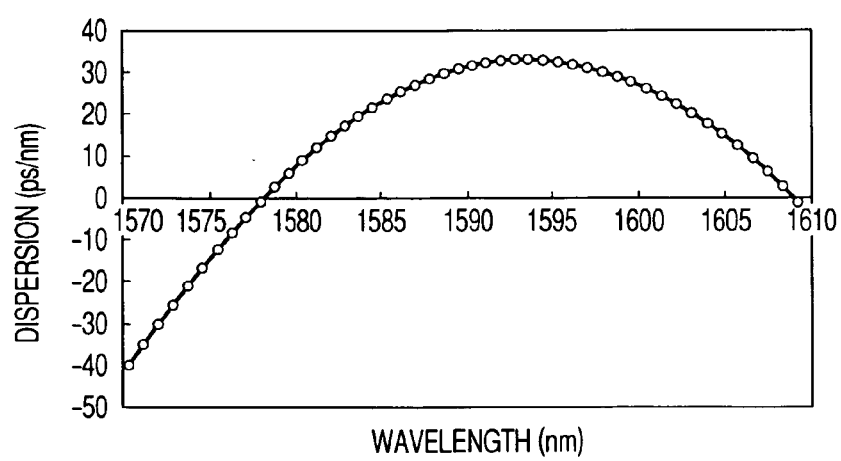
(3) SET VALUE FOR THE VARIABLE DISPERSION COMPENSATOR

FIG. 12

| WAVELENGTH# | | λ1 | λ2 | λ3 | ... | λ24 | λ25 | ... | λ46 | λ47 |
|---|---|---|---|---|---|---|---|---|---|---|
| WAVELENGTH (nm) | | 1570.42 | 1571.24 | 1572.06 | ... | 1589.57 | 1590.41 | ... | 1608.33 | 1609.19 |
| DISPERSION AMOUNT (ps/nm) | ID1 | 142.4 | 146.9 | 151.5 | ... | 249.6 | 254.3 | ... | 354.6 | 359.5 |
| | ID2 | 85.8 | 89.2 | 92.7 | | 166.2 | 169.7 | | 245.0 | 248.6 |
| | ID3 | 43.2 | 45.5 | 47.8 | | 96.8 | 99.1 | | 149.3 | 151.7 |
| | ID4 | 21.9 | 23.6 | 25.3 | | 62.1 | 63.9 | | 101.5 | 103.3 |
| | ... | | | | | | | | | |

(a) EXAMPLE OF DISPERSION DATA TABLE FOR TRANSMISSION LINES

| WAVELENGTH# | | λ1 | λ2 | λ3 | ... | λ24 | λ25 | ... | λ46 | λ47 |
|---|---|---|---|---|---|---|---|---|---|---|
| WAVELENGTH (nm) | | 1570.42 | 1571.24 | 1572.06 | ... | 1589.57 | 1590.41 | ... | 1608.33 | 1609.19 |
| DISPERSION AMOUNT (ps/nm) | id1 | -151.6 | -154.7 | -158.0 | ... | -247.3 | -252.6 | ... | -385.6 | -393.0 |
| | id2 | -91.0 | -92.8 | -94.8 | | -148.4 | -151.5 | | -231.3 | -235.8 |
| | id3 | -60.6 | -61.9 | -63.2 | | -98.9 | -101.0 | | -154.2 | -157.2 |
| | id4 | -30.3 | -30.9 | -31.6 | | -49.5 | -50.5 | | -77.1 | -78.6 |
| | ... | | | | | | | | | |

(b) EXAMPLE OF DISPERSION DATA TABLE FOR FIXED DISPERSION COMPENSATOR

| BEFORE SWITCHING | ID1 | ID2 | ... | IDn | id1 | id2 | id3 | ... | idn+1 |
|---|---|---|---|---|---|---|---|---|---|
| AFTER DISPERSION | ID51 | ID2 | ... | IDn | id51 | id52 | id3 | ... | idn+1 |

WAVELENGTH DIVISION MULTIPLEX (WDM) TRANSMISSION SYSTEM

CLAIM OF PRIORITY

The present application claims priority from Japanese application JP 2006-020529 filed on Jan. 30, 2006, the content of which is hereby incorporated by reference into this application.

FIELD OF THE INVENTION

The present invention relates to a WDM (Wavelength Division Multiplex) transmission system, in particular to a WDM transmission system wherein any residual dispersion dependent on wavelength that may have developed when the dispersion of the transmission fiber is compensated by a fixed dispersion compensator can be compensated by the variable dispersion compensator.

BACKGROUND OF THE INVENTION

In the high-speed optical fiber communication, light waveform may sometimes deteriorate limiting transmission speed and transmission distance due to a characteristic of wavelength dispersion in the fiber. Wavelength dispersion (hereinafter referred to as "dispersion") means the wavelength dependence of group velocity at which signals propagate in the optical fiber. Strictly speaking, light waveform has a plurality of wavelength components (the spectrum spreads out), and when the group velocity is dependent on wavelength, there appear some components that advance slowly in the fiber and some other components that advance quickly, and as a result the waveform expands, and if the dispersion value is not negligible, the waveform is deformed and receiving characteristics deteriorates. As dispersion amount is proportionate to the fiber length, transmission distance is limited as a consequence.

Generally, dispersion amount depends on the type and distance of the optical fiber. To cite an example of numerical value, in the case of the most ordinary SMF (single mode fiber) as laid optical fiber, for example, the dispersion amount per km is about 17 ps/nm/km.

In a transmission system of 10 Gbps, the dispersion tolerance of optical signals is approximately 1,000 ps/nm, and when the transmission line length exceeds 60 km, it is sometimes impossible to receive under the impact of waveform deformation. As the effect of dispersion is in inverse proportion to the square of the signal bit rate, for example in a transmission system of 40 Gbps, the dispersion tolerance of optical signals is reduced to one sixteenth ($1/16$) of the value mentioned above, and it is often difficult to realize the transmission of more than several kilometers without countermeasures against dispersion.

A traditional method that has been used generally to avoid the effect of waveform deformation due to dispersion is the application of a dispersion compensator. The dispersion compensator is an optical device whose dispersion amount is inverse to the dispersion amount of the optical fiber used in the transmission line. This dispersion compensator cancels dispersion in the optical fiber enabling to contain the waveform deformation resulting from dispersion.

As this dispersion compensator, dispersion compensation fiber (DCF) is one of the devices most frequently used. The DCF is a device designed to maintain a dispersion property inverse to that of the optical fiber in the transmission line by devising on the material and construction of the fiber. Among various types of dispersion compensator, one type cancels dispersion at a specific wavelength and another type cancels the dispersion wavelength dependency (dispersion slope value) of the optical fiber in the transmission line. In addition, generally, the dispersion compensation amount of the DCF is determined by the length of the DCF. Therefore, in this case, when the fiber length is fixed upon determining its length once, this dispersion compensation amount is fixed. Such a dispersion compensator is called "a fixed dispersion compensator" in the sense that the dispersion amount is fixed.

As this fixed dispersion compensator, in addition to the above-mentioned DCF, fiber grating is also generally used. The fiber grating is a device made by irradiating an optical fiber with ultraviolet rays so that a refraction index changing structure is formed by the light wavelength order within the optical fiber. The refraction index changing structure behaves like a diffraction grating and acts as a reflection mirror at a specified wavelength. It is possible to adjust the amount of delay at the time of reflection for each wavelength by forming this refraction index changing structure in such a way that the cycle may be narrow down (or widen) in the axial direction of the optical fiber. Therefore, it will be possible to cancel the dispersion characteristic of the optical fiber in the transmission line by adequately designing this cycle. Such a fiber grating susceptible of dispersion compensation is called "chirped fiber grating (CFBG).

However, in a super high-speed transmission system of 40 Gbps, in view of a very narrow range of dispersion tolerance of 100 ps/nm or less for example as mentioned above, it is normally difficult to finely adjust dispersion compensation by means of a fixed dispersion compensator adapting to the length of the transmission fiber. In addition, when the WDM transmission system is taken into consideration, it is necessary to take into account not only the dispersion amount but also the wavelength dependency of the dispersion amount itself called "dispersion slope value" (difference in dispersion amount for each signal wavelength among the WDM signals). In case of an attempt to adjust the dispersion amount to be compensated for each wavelength in this way by means of a fixed dispersion compensator, it is necessary to prepare in advance a large number of fixed dispersion compensators of different compensation amount, and this constitute an problem regarding cost. Although there is a DCF designed to compensate even dispersion slope value as mentioned above, it is normally difficult to compensate completely dispersion slope value. For example, in a transmitter having a stringent dispersion tolerance of 40 Gbps, a dispersion adjustment for each wavelength is still required and it is difficult to realize dispersion compensation with a fixed dispersion compensator.

On the other hand, as a variable dispersion compensator with variable compensation amount, the above-mentioned method of forming a temperature grading in the axial direction of CFBG is known. Dispersion amount becomes variable when this temperature grading is controlled.

FIG. 18 shows the configuration for the control of the traditional variable dispersion compensator.

In order to control the dispersion amount of a variable dispersion compensator to the optimum value, an adaptive control circuit is necessary. An example of this control circuit is, for example, the configuration shown in Invention by Benjamin John Eggleton: "Optical communication system provided with an automatic dispersion compensation module", JP-A No. 244394/2000. This adaptive control circuit includes a variable dispersion compensator (101), a variable dispersion compensator (102), an optical filter (103), an OE (104), the recovery unit of a data clock (105), error detection unit (106), error rate computing unit (107), control circuit (108) and control circuit (109).

In the same configuration, optical data are converted into electric signals by the OE (104) after passing through an invariable dispersion compensator (101, and a variable dispersion compensator (102). The error detecting unit (106) detects signal errors and the error rate computing unit (107) computes the error rate of electric signals being received. From the change in this error rate, the new control value is computed by the control circuit (108) and the control circuit (109) to control said variable dispersion compensator (101) or the variable dispersion compensator (102).

And other variable dispersion compensators are described in the non-patent documents 2, 3 and the like as described below.

SUMMARY OF THE INVENTION

However, in a conventional dispersion compensator as shown in FIG. 18, in the case of a severe degradation of signals, due to a sharp rise in the number of errors, the measurement cycle must be shortened in order to avoid any overflow in the counter. However, if the measurement time is reduced, precision in the case of low number of errors falls down and consequently it is almost impossible to shorten too much the measurement cycle, and as a result it will be difficult to measure large error rates such as 10 to the minus fourth power or 10 to the minus third power, and in the case of severe signal degradation, the dispersion compensator often does not work well.

In addition, at the time of start-up of the variable dispersion compensator, the initial value of dispersion of the variable dispersion compensator is not always an adequate dispersion amount, and it is possible on the contrary that it has deviated from an appropriate dispersion amount. As described above, if the signal degradation is severe, its function is normally difficult according to the traditional configuration shown in FIG. 18. For this reason, it is necessary to make a rough adjustment to some extent by sweeping the dispersion amount and the like. As a result, the start-up time becomes long, constituting a problem.

Moreover, a mechanism of measuring error rate is required for every signal wavelength, possibly resulting in a high cost of optical receiver. If a feedback-type adaptive control is to be carried out in a traditional case other than the configuration shown in FIG. 18, a method of controlling to an adequate dispersion amount by analyzing clock amplitude, data amplitude, data waveform and the like from the electric signals has been proposed. In any case, however, expensive high-speed electric components are required and this constitute a problem with respect to costs.

In view of the points described above, the objects of the present invention are to provide a low-cost variable dispersion compensator and to control at a high speed in a variable dispersion compensator for compensating wavelength dependent accumulated dispersion resulting from the wavelength dependency of transmission fiber and fixed dispersion compensators in a long-distance high-speed WDM transmission system.

A configuration that the present invention provides in view of such a problem is a WDM transmission system including in particular dispersion compensator of which the dispersion amount is fixed, a dispersion compensator of which the dispersion amount is variable, a control circuit of dispersion compensator for controlling the dispersion amount of said variable dispersion compensators, the control circuit of dispersion compensator includes both a table for managing the average dispersion slope value in the transmission fiber and a table for managing the dispersion amount wavelength dependency data of said fixed dispersion compensators corresponding to the predetermined dispersion amount at the representative wavelength, and said control circuit of dispersion compensators computes the accumulated dispersion amount for each wavelength based on the inputs of the measurement value of dispersion amount for the representative wavelength of the transmission fiber, the fiber length measurement value and the set amount of dispersion at the representative wavelength of the fixed dispersion amount compensators and by using said two types of tables, and controls said variable dispersion compensator based on this accumulated dispersion amount.

And another configuration provided by the present invention is a WDM transmission system characterized in that, particularly in a WDM transmission system including dispersion compensators of which the dispersion amount is fixed, a dispersion compensator of which the dispersion amount is variable and a control circuit of dispersion compensators for controlling the dispersion amount of said dispersion compensator, said control circuit of variable dispersion compensator includes inside both a table for managing the ID numbers of transmission fibers and the dispersion amount wavelength dependent data for each same ID number and a table for managing the ID numbers of fixed dispersion compensators and the dispersion wavelength dependent data for each same ID number, and said control circuit of dispersion compensator computes the accumulated dispersion amount for each wavelength based on the input of the ID numbers of transmission fibers and the ID numbers of said fixed dispersion compensators by using said two types of tables, and control said variable dispersion compensator based on this accumulated dispersion amount.

And one more configuration provided by the present invention is a WDM transmission system characterized in that, particularly an optical cross-connect or an optical add-drop multiplexer for exchanging the whole or a part of the signal wavelength of the WDM signals are provided in the transmission line, and immediately before switching the optical switch in the optical cross-connect or the optical add-drop multiplexer, the accumulated dispersion amount by the new route after the exchange is computed in advance in the manner described in said configuration of the present invention, and at the same time as or immediately before switching said optical switch, the new set value of dispersion amount is set in the variable dispersion compensator.

According to the present invention, it will be possible to control with a low-cost configuration and at a high speed the wavelength dependency of residual dispersion that cannot be compensated even with fixed dispersion compensators by computing the dispersion compensation amount based on the input of the dispersion characteristics in the transmission line and at the representative wavelength of the DCF, using also the dispersion wavelength dependency characteristic recorded in advance in the control circuit and controlling the variable dispersion compensator.

And according to the present invention, it will be possible to control with a low-cost configuration and at a high speed the wavelength dependency of residual dispersion that cannot be compensated even with fixed dispersion compensators by searching and extracting the dispersion wavelength dependency recorded in advance in the transmission line taking the ID information of the transmission line and the DCF as index, by computing the dispersion compensation amount and by controlling the variable dispersion compensator.

And according to the present invention, it will be possible to control with a low-cost configuration and at a high speed the wavelength dependency of residual dispersion that cannot be compensated even by means of fixed dispersion compensators by searching and extracting the dispersion wavelength dependency recorded in advance in the control circuit taking the ID information of the transmission line and the DCF as index, by computing the dispersion compensation amount and by cooperatively controlling the optical cross-connect, or the optical add drop multiplexer and the variable dispersion compensator. And it will be possible to speed up the recording of dispersion compensation amount into a high-speed one during the switching time of routes on an optical cross-connect or an optical add-drop multiplexer, in other words to shorten the communication disruption time resulting from the switching of routes in an optical cross-connect or an optical add-drop multiplexer.

BRIEF DESCRIPTION OF THE DRAWINGS

FIG. 2 is a table describing the dispersion control signal sent out to the dispersion compensators;

FIG. 3 is a set of graphs describing the method of computing dispersion in a transmission route;

FIG. 4 is a set of graphs describing the method of computing dispersion in a fixed dispersion compensator;

FIG. 6 is an example of the descriptive dispersion data table of transmission lines and a fixed transmission compensator;

FIG. 10 is an example of computing the dispersion compensation amount in a model of WDM transmission system;

FIG. 12 is a set of descriptive dispersion data tables in the transmission lines and a fixed dispersion compensator in the second embodiment;

DESCRIPTION OF THE PREFERRED EMBODIMENTS

1. The First Embodiment (1) WDM Transmission System

Figure 1:
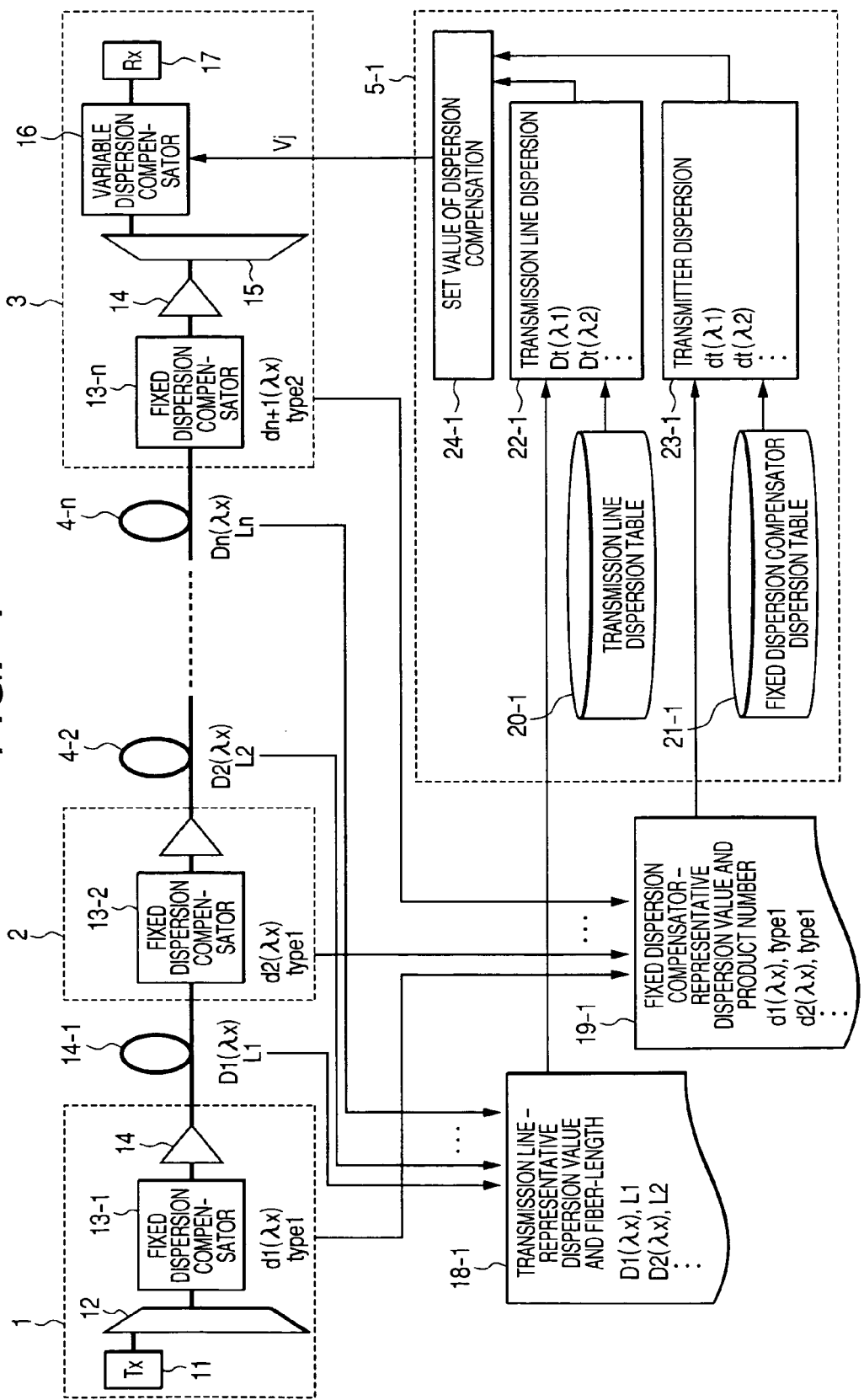
FIG. 1 is a block diagram showing the configuration of the first embodiment of the WDM transmission system.

FIG. 1 shows the configuration of the first embodiment of the WDM transmission system.

We will describe below the first embodiment of the present invention.

The WDM transmission system that we propose includes a WDM transmitter (1), a WDM relay (2), a WDM receiver (3), a control circuit (5-1), and respective fibers (4-1, 2, The WDM transmitter (1) comprises further an optical transmitter (11) for sending out modulated optical signals, a multiplexer (12) for multiplexing various signal wavelengths coming from the optical transmitter, fixed dispersion compensators (13-1) for compensating a fixed amount of dispersion and an optical amplifier (14). The WDM relay (2) comprises fixed dispersion compensators (13-2, 3, . . . ), and an optical amplifier (14). The WDM receiver (3) comprises fixed dispersion compensators (13-$n$), an optical amplifier (14), a multiplexer for separating the WDM signals to respective separate signal wavelength (15), a variable dispersion compensator of which the dispersion amount is variable (16), and an optical receiver for converting optical signals into electric signals (17). Each optical amplifier (14) amplifies en mass the WDM signals that has damped in the optical fiber to restore the signal level to its former state.

One of the devices actually used as a variable dispersion compensator (16) is, as mentioned above, chirped fiber grating. For example, the R. I. Laming: "A Dispersion Tunable Grating in a 11-Gbps 100-220 km—Step Index Fiber Link". IEEE Photonics Technology Letters, Vol. 8, No. 3, or 428-430 (1996) describes a method of creating chirped grating by creating a temperature grading in the axial direction of a uniform optical fiber grating. In this case, it will be possible to proceed to a dispersion compensation of variable amount by controlling the temperature grading. And the method of creating a chirped grating by applying a stress intensity grading with a physical mechanism and proceeding to variable dispersion compensation by controlling this stress grading has been proposed frequently. In addition to the fiber grating, a variable dispersion compensator can be realized by proceeding to dispersion compensation by creating difference of optical path length for each component of wavelength by means of a silica optical waveguide and adjusting this difference of optical path length by means of an electric heater and the like. It is also possible to realize a variable dispersion compensator by adjusting the resonator length of an etalon resonator. Furthermore, as described in the Shirasaki: "Compensation of chromatic dispersion and dispersion slope using a virtually imaged phased array", Optical Fiber Conference (OFC) '01, paper TuS1 (2001), a so-called VIPA (virtually imaged phased array)-type variable dispersion compensator constituted by a wavelength dispersion element made by coating a reflection film on both sides of a thin film and a three-dimension reflection mirror is also used generally.

In any dispersion compensator, in order to enhance the convenience for the user of the device, generally a voltage control type (or current control type) device structure is adopted wherein the dispersion amount inside the dispersion compensator is adjusted for each wavelength by adjusting voltage or current from the outside. In the following description, this voltage applied from the outside for adjusting dispersion is called a dispersion control signal.

In the variable optical dispersion compensator (16), the control circuit (5-1) controls the dispersion amount. The control circuit (5-1) includes inside a processor (22-1) for computing the dispersion amount of the transmission line and a processor (23-1) for computing the dispersion amount of fixed dispersion compensators. Each processor (22-1) (23-1) is connected with a storage area, and in the respective storage area the control circuit managers the dispersion data table (20-1) of the transmission lines and the dispersion data table (21-1) of the fixed dispersion compensators.

The processor (22-1) computes the dispersion amount of transmission lines for each wavelength of the WDM signals based on, for example, inputs of the representative dispersion value of transmission line and fiber length (18-1) and by using at the same time the dispersion data table of transmission lines (20-1). Similarly, the processor (23-1) computes, for example, the dispersion amount of fixed dispersion compensators for each wavelength of the WDM signal based on, for example, input of the representative dispersion value of fixed dispersion compensator (19-1) and by using at the same time the dispersion data table of fixed dispersion compensator (21-1). The details of the computing method shall be described further below.

FIG. 2 shows a table describing the dispersion control signal sent out by the dispersion compensator.

The dispersion compensation amount setting circuit (24-1) computes the set amount of dispersion of the variable dispersion compensator (16) for each wavelength of the WDM signal based on the accumulated dispersion of the transmission lines acquired by the processor (22-1) and the accumulated dispersion of the fixed dispersion compensators acquired by the processor (23-1) and sends out the dispersion control signals (control voltage) as shown in FIG. 2 for each wavelength to the variable dispersion compensator (16) so that the dispersion amount of the variable dispersion compensator (16) would be set amount of dispersion actually computed.

(2) Overview of the Computation of Accumulated Dispersion

We will now describe below the computing process of the dispersion amount of the transmission lines and the dispersion amount of the fixed dispersion compensators in the processor (22-1) and the processor (23-1).

FIG. 3 shows graphs describing the computing method of dispersion amount in the transmission lines.

FIG. 3 (*a*) is a graph showing the wavelength dependency of a dispersion parameter that means a fiber dispersion amount per km. In this case, a dispersion shifted fiber (DSF) is used as an example of the transmission fiber. The dispersion shifted fiber is a generally used fiber as fiber for laying along with the above-mentioned single-mode fiber (SMF). Generally speaking, the fiber dispersion has a characteristic of growing larger on the longer wavelength side. And it is possible to approximate linearly in the WDM transmission zone. The wavelength at which dispersion or dispersion coefficient is reduced to zero is generally called "zero dispersion wavelength ($\lambda 0$). For example, in the case of FIG. 3 (*a*) or (*b*), the wavelength at which each straight line crosses the X axis is the zero dispersion wavelength, and the zero dispersion wavelength for the fiber A and the fiber B is respectively 1,550 nm and 1,560 nm. As shown in this case, the zero dispersion wavelength for the dispersion shifted fiber is not constant, and the zero dispersion wavelength of dispersion shifted fibers actually laid also varies by the route. The inclination of the straight line representing dispersion characteristic is called "dispersion slope value," and this dispersion slope value is more or less constant, and generally is in the range of 0.06-0.09 ps/nm$^2$/km. In the case shown in FIG. 3, the dispersion slope value is 0.7 ps/nm$^2$/km.

FIG. 3 (*b*) is a graph showing the dispersion amount of the whole fiber for the fiber A with a fiber length of 60 km and the fiber B with a fiber length of 100 km.

The zero dispersion wavelength of laid fiber is varied, and the fiber length is also naturally varied. As a result, the actual fiber dispersion amount consists of various values, and as shown in FIG. 3 (*b*) their wavelength dependency is dissimilar. However, as the dispersion slope value mentioned above is almost even, the dispersion amount of a randomly chosen dispersion shifted fiber can be indicated essentially by a dispersion amount at a wavelength and the fiber length. In other words, when the dispersion amount at a wavelength and the fiber length are given, it is possible to compute the dispersion amount at the whole other signal wavelengths. Hereafter, "a wavelength" for which this dispersion amount is known is called "the representative wavelength" and "the specific wavelength."

The case of computing the dispersion amount for the signal wavelength of 1570 nm when the representative wavelength is assumed to be 1,590 nm is shown below. The fact that the dispersion amount of the fiber A at the representative wavelength (1,590 nm) is 168 ps/nm as shown by black circles in FIG. 3 (*b*), and the fiber length is 60 km should be clear in advance. From such information, the dispersion parameter of the fiber A is computed to be 168 [ps/nm]/60 [km]=2.8 ps/nm/km as shown in FIG. 3 (*a*). Supposing the fact that the dispersion slope value is 0.07 ps/nm$^2$/km is known, the dispersion parameter can be expressed as:

Primary function $y=0.07$ [ps/nm$^2$/km]$\times(x-1,590$ [km])+2.8 [ps/nm/km], and the dispersion parameter at the signal wavelength (1,570 nm) is computed to be:

0.07 [ps/nm$^2$/km]$\times$(1,570 [km]−1,590 [km])+2.8 [ps/nm/km]=1.4 ps/nm/km. And as the fiber length is 60 km, the dispersion amount at the signal wavelength (1,570 nm) can be computed as 1.4 [ps/nm/km]$\times$60 [km]=84 ps/nm as shown by white circle points in FIG. 3(*b*). In the case of wavelength other than 1,570 nm, computations may be made easily in the same way.

With regards to fiber B in the same way, the fact that the dispersion amount at the representative wavelength (1,590 nm) is 210 ps/nm and the fiber length is 100 km should be known in advance. From such information, it is possible to compute the dispersion parameter, to compute the dispersion parameter (in this case 0.7 ps/nm/km) at the signal wavelength (x=1,570 nm) from the primary function (y=0.07 [ps/nm$^2$/km]$\times$(x−1,590 [km])+2.1 [ps/nm/km]), and ultimately to compute that the dispersion amount at the signal wavelength [1,570 nm] is 70 ps/nm (=0.7 [ps/nm/km]$\times$100 [km]).

FIG. 4 represents graphs describing the method of computing dispersion amount of fixed dispersion compensators.

Although, in this case, the dispersion compensation fiber (DCF) described above is used as a fixed dispersion compensator, this is not limitative. For example, as a dispersion compensator, the above-mentioned chirped fiber grating (CFBG) is also generally used. And as in the case of the variable dispersion compensator, there are a variety of forms of the fixed dispersion compensator such as etalon-type or silica optical waveguide type. However, DCF is one of the most generally used type. Incidentally, in the case of FIG. 4, a dispersion slope value compensating-type of DCF is used.

FIG. 4 (a) is a graph showing the dispersion parameter characteristic of the transmission line per km. It is a graph showing the characteristic indices of dispersion parameters in the same way as FIG. 3 (a).

FIG. 4 (b) is a graph showing the dispersion characteristics of DCF. This DCF is designed to compensate dispersion at all the signal wavelengths by taking into account the dispersion slope value. For example, with regard to DCF for the fiber A, when the dispersion compensation amount at the representative wavelength (1,590 nm) is set at −100 ps/nm, the dispersion of the fiber A for 100 [ps/nm]/2.8 [ps/nm/km]=35.7 km will be compensated. Therefore, at the wavelength of 1,570 nm, a characteristic that would lead to a dispersion compensation amount of −33 ps/nm (=0.7[ps/nm/km]×47.6 [km]) would be required of the DCF for the fiber B.

Due to production errors that occur in reality, a slippage of several ps/nm from such ideal characteristics may have to be tolerated. Generally, the formation of a upward convex curve is expected as in the case of the characteristic of the DCF for the fiber A (actual) shown in FIG. 4 (b).

As FIG. 4 (b) shows, if the zero dispersion wavelength of the object transmission fiber is different, the characteristics of the corresponding DCF will be different. As described above, as the zero dispersion wavelength of the transmission fiber is varied, it is ideal to prepare a variety of DCF by changing the shape of slope or curve in response to the variation of the zero dispersion wavelength of the transmission fiber. However, upon consideration of the actual management of the system, it would be unprofitable from the viewpoint of cost to prepare a large variety of DCF. Therefore, it would be realistic to limit the variety of types of slope to only one type or several types, and to adjust the dispersion amount by the length of the DCF.

If the type of the DCF is identified to be one (slope is limited to one) or its type is identified to be any one of several types, and the shape of the slope or curve of the DCF is known, it is possible to compute the dispersion amount of the DCF at all the signal wavelength from the dispersion amount at the representative wavelength in the same way as the transmission fiber. For example, the slope form of the DCF (the curve characteristic of the DCF for fiber (actual) shown in FIG. 4 (b)) may be recorded separately in advance. For example, the dispersion amount for each wavelength, functions representing the form of slope and the like may be stored in some relevant storage devices and the processor (22-1) and the like may be used to read such data so that they can be used for computation processing. Supposing that the dispersion amount at the representative wavelength (1,590 nm) is −150 ps/nm, as shown in FIG. 4 (c), with reference to the curve characteristic separately stored, the dispersion amount at the signal wavelength (1,570 nm) and the representative wavelength (1,590 nm), respectively −60 ps/nm and −100 ps/nm are acquired. By the linear conversion of dispersion with these values, it is possible to compute that the dispersion amount for the signal wavelength (1,570 nm) as follows: −150 [ps/nm]/100[ps/nm]×60 [ps/nm]=−90 ps/nm. With any wavelength other than 1, 570 nm, it is possible likewise to compute easily.

After following through the process described above, the processor (22-1) computes the dispersion amount of transmission lines for each wavelength of the WDM signal based on inputs of the representative dispersion value showing the dispersion amount at the representative wavelength of the transmission line and the fiber length (18-1), and using at the same time the dispersion data table of the transmission line (201) (for example, dispersion slope value). Similarly, the processor (23-1) computes the dispersion amount of fixed dispersion compensators for each wavelength of the WDM signal based on the input of the representative dispersion value (19-1) of fixed dispersion compensators and using at the same time the dispersion data table (21-1) of fixed dispersion compensators (for example, dispersion wavelength dependency characteristic, and slope form of dispersion amount).

Figure 5:
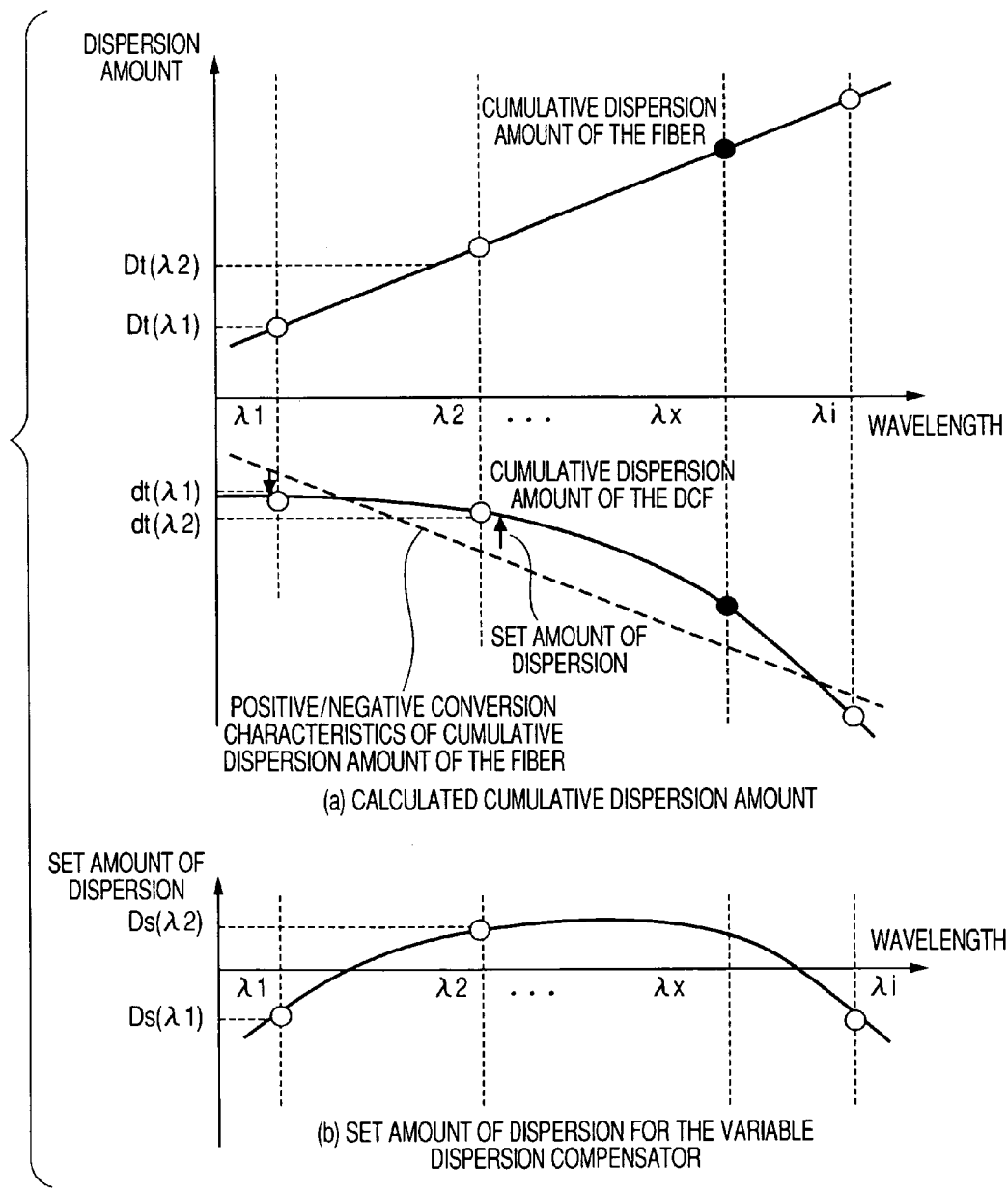
FIG. 5 is a set of graphs describing the method of computing the dispersion compensation amount of a variable dispersion compensator.

FIG. 5 is a graph describing the method of computing the dispersion compensation amount of the variable dispersion compensator.

When the dispersion amount of various transmission fibers and the dispersion amount of various DCF computed as described above are added up, as shown in FIG. 5 (a), the accumulated dispersion amount Dt ($\lambda$) for each wavelength $\lambda$ in all the transmission fibers and the accumulated dispersion amount dt($\lambda$) for each wavelength kin all the DCF are computed. The total sum of these accumulated dispersion amount in all the transmission fibers and the accumulated dispersion amount in all the DCF for each wavelength will be the total accumulated dispersion amount, and if a 100% dispersion compensation is to be implemented, a value sufficient to cancel this total accumulated dispersion amount, in other words, −{Dt($\lambda$)+dt($\lambda$)} will be a required compensation amount of the variable dispersion compensator. In other words, the balance remaining after deducting the accumulated dispersion amount in all the DCF from the positive-negative inversion characteristics of the accumulated dispersion amount in all the transmission fibers will be −Dt($\lambda$)−dt($\lambda$), and this value will be the compensation amount of the variable dispersion compensator in the case of implementing a 100% dispersion compensation. This compensation amount of the variable dispersion compensator is expressed as shown in FIG. 5 (b).

(3) Dispersion Data Table

FIG. 6 shows an example of descriptive graph of the dispersion data table (20-1) of the transmission lines and the dispersion data table (21-1) of the fixed dispersion compensators. As shown in FIG. 6 (a), the dispersion table for transmission lines (20-1) records the value of 0.07 ps/nm$^2$/km as the dispersion slope value of the transmission fibers laid. For this dispersion slope value, design specification values may be used, and the averaged value of actual measurement in the actual field may also be used.

And as shown in FIG. 6 (b), the dispersion data table (21-1) for the fixed dispersion compensators records the dispersion amount for each signal wavelength ($\lambda 1, \lambda 2, \ldots$) by taking the type of fixed dispersion compensator (type 1, type 2, $\ldots$) as an index. It also records at the same time the dispersion amount according to the representative wavelength ($\lambda$x). In this case, the dispersion amount is standardized so that the dispersion amount at the representative wavelength may be −100 ps/nm. However, this is not limitative, and a dispersion parameter equal to the dispersion amount per kilometer may be used. In short, all that is required is that the data representing the wavelength dependency of the fixed dispersion compensator are stored. This table records dispersion amounts relating to values at the ITU grid wavelength between 1,570.42 nm and 1,609.19 nm. However, grids different from the WDM signals wavelength such as 1,570 nm, 1,571 nm may be used, and the dispersion amount may be easily estimated by linear interpolation. For example, if the dispersion amount at 1,570 nm of −60.42 ps/nm, and the dispersion amount at 1,571 nm of −61 ps/nm are recorded, the dispersion amount at a wavelength $\lambda 1$ (1,570.42 nm) can be converted to −60 ps/nm by linear interpolation.

And as shown in FIG. 6 (b), in the dispersion data table of fixed dispersion compensators, the number of entries in the table increases as shown by type 1, type 2, ... according on the type of fixed dispersion compensators. However, as described above, taking into account the management and production cost and the like of the DCF, it is preferable that the number of types of the DCF be limited, and if the type of the DCF is only one, the entry of one type (one line) in this table will be sufficient.

(4) Computing Processing of Dispersion Compensation Amount

Figure 7:
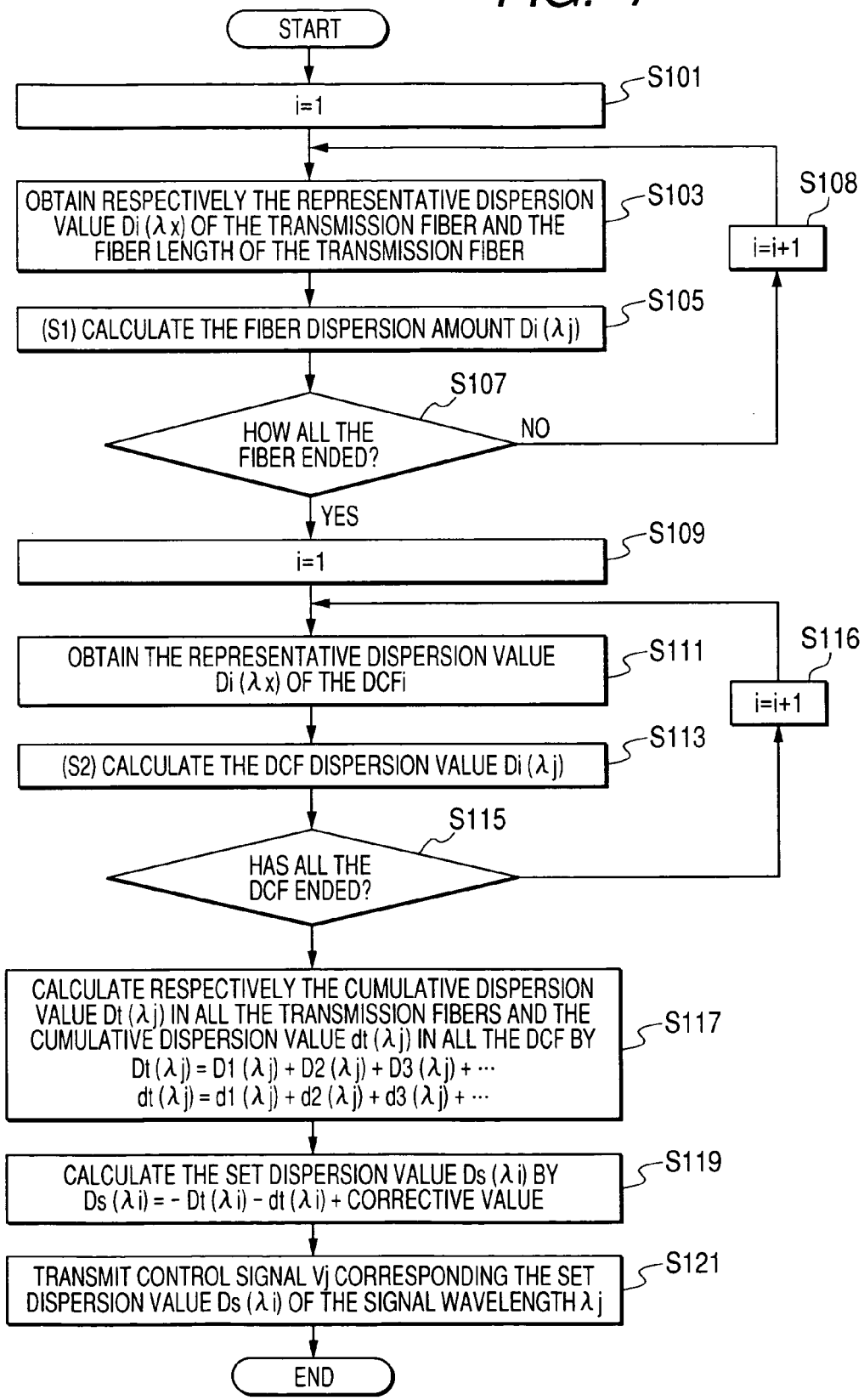
FIG. 7 is a flowchart describing the process of computing dispersion compensation amount.

FIG. 7 shows a flowchart describing the process of computing the dispersion compensation amount (set amount of dispersion) described above.

FIG. 7 represents the process flow of computing the amount of dispersion compensation at the wavelength $\lambda j$ carried out by the control circuit (5-1), and by the repetition of this flow for all the wavelengths $\lambda 1, \lambda 2, \ldots \lambda N$, the amount of dispersion compensation (set amount of dispersion) at all the wavelengths is computed, and adequate dispersion control signal Vj will be sent out to the variable dispersion compensator (16) for every wavelength j (j=1, 2, ... ).

In the first place, the processor (22-1) of the control circuit (5-1) sets the initial value (for example, i=1) as information for identifying the transmission fibers (i=1, 2, ... ) (S101). Then, the processor (22-1) acquires respectively the representative dispersion value $Di(\lambda x)$ at the representative wavelength ($\lambda x$) for the transmission fiber length Li (S103). Such information can be acquired by manually inputting the specification data for each fiber before the installation of the WDM apparatus (WDM transmission system) or the actual measurement values at the time of installation into the control circuit (5-1), or by inputting the same indirectly by means of the memory or the communication route. Or, the information may be inputted by installing a means of measuring dispersion in the WDM apparatus, measuring automatically during or immediately before operating the WDM apparatus, and inputting into the apparatus through a management system communication line.

Then, the fiber dispersion amount $Di(\lambda j)$ of the transmission fiber is computed from the representative dispersion value Di ($\lambda x$) at the representative wavelength of the transmission fiber and the fiber length Li that the processor (22-1) had acquired in the step S103 (S105). (We will describe the details further below.)

Then, the processor (22-1) judges whether the acquisition of information on dispersion amount corresponding to all the transmission fibers i (i=1, 2, ... ) (4-1, 2, ... ) has been completed (S107), and when it has not been completed, the values of i are added up (for example, i=i+1) (S108), and the dispersion amount Di ($\lambda j$) ((i=1, 2, ... ), (j=1, 2, ... )) of all the transmission fibers at all the wavelengths are acquired in the steps S103, and S105.

Then, the processor (23-1) of the control circuit (5-1) sets the initial value (for example, i=1) as information for identifying CDFi (i=1, 2, ... ) (S109). Then, the processor (23-1) acquires the representative dispersion value $di(\lambda x)$ also for DCF (S111). Such information can be acquired by manually inputting the actual representative dispersion value of the DCF installed in the control circuit (5-1) or by inputting the same indirectly by means of the memory or the communication circuit. Or, the representative dispersion value may be stored in the DCF module itself, and when the DCF module is added on the apparatus rack, the information may be automatically sent to the control circuit through the management system. And when there are more than one type of DCF, this DCF type (type 1, type 2, ... ) is notified to the control circuit (5-1) in addition to the representative dispersion value di ($\lambda x$). If the type is only one, there is no need to notify the type of DCF.

Then, based on the representative dispersion value di ($\lambda x$) that the processor (23-1) had acquired in the step S111, the dispersion amount of the DCF $di(\lambda j)$ will be computed (S113). (We will describe the details further below.)

Then, the processor (23-1) judges whether the acquisition of information on dispersion amount corresponding to all the DCFi (i=1, 2, ... ) (13-1, 2, ... ) has been completed or not (S115), and when it has not been completed, the values of i are added up (for example, i=i+1) (S116), and the dispersion amount $di(\lambda j)$((i=1, 2, ... ), (j=1, 2, ... )) of all the DCFs at all the wavelengths are acquired in the steps S111 and S113. Then, the dispersion compensation setting circuit (24-1) adds up the fiber dispersion amount D1 ($\lambda j$), D2 ($\lambda j$), D3 ($\lambda j$), ... for all the fibers at each wavelength $\lambda j$ to compute the accumulated dispersion amount Dt($\lambda j$) for each wavelength $\lambda j$ of the transmission fiber. Similarly, DCF dispersion amount d1($\lambda j$), d2($\lambda j$), d3($\lambda j$), ... is added up for all the whole DCF at the wavelength $\lambda j$ to compute the accumulated dispersion amount dt($\lambda j$) for each wavelength (S117). In the case of 100% compensation, the set amount of dispersion Ds($\lambda j$) of the variable dispersion compensator (16) will be computed by $-Dt(\lambda j)-dt(\lambda j)$ (S119). Depending on the circumstances, in order to improve the transmission characteristics, undercompensation or overcompensation may be effectuated by adding corrected values to this. As the above-mentioned computation of dispersion is possible in principle by following the four fundamental rules of arithmetics, the time required for computation is very short, and as the number of entries and items of data do not exceed several times of the number of the WDM signal wavelength, the time required for searches is very trivial, and in either case the processing time is negligible as compared with the control time constant of the variable dispersion compensator. Therefore, with regards to the control time, the control time constant of the variable dispersion compensator is dominant, and very high-speed control is possible.

Then, the dispersion compensation setting circuit (24-1) transmits dispersion control signals Vj corresponding to the set amount of dispersion Ds($\lambda j$) of the computed wavelength $\lambda j$ to the variable dispersion compensator (16), and controls the variable dispersion compensator (16) so that the dispersion amount of the same may be Ds($\lambda j$) (S121).

Figure 8:
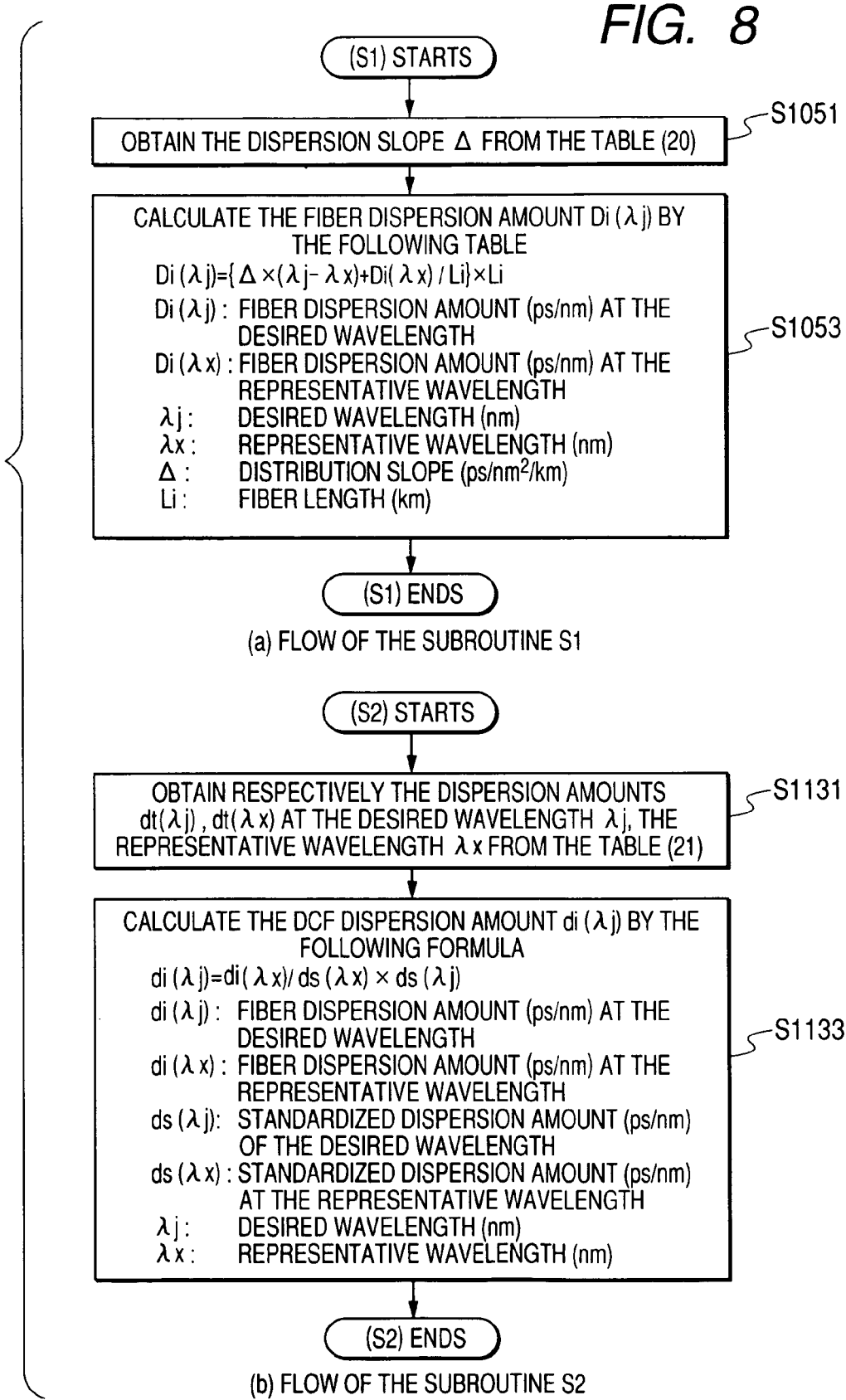
FIG. 8 is a flowchart of subroutines for computing dispersion compensation amount.

FIG. 8 is a flowchart of subroutines for computing dispersion compensation amount.

FIG. 8 (a) is a flowchart for seeking the fiber dispersion amount.

The processor (22-1) acquires dispersion slope values corresponding to the transmission fibers i (i=1, 2, ... ) from the dispersion data table (20-1) (S1051), and computes dispersion amount Di ($\lambda j$). This process is expressed by the following equation when the desired wavelength (nm) is represented respectively by $\lambda j$, the representative wavelength (nm) by $\lambda x$, the fiber dispersion amount (ps/nm) at the desired wavelength by Di($\lambda j$), the fiber dispersion amount at the representative wavelength (ps/nm) by Di($\lambda x$), the dispersion slope value (ps/nm/nm/km) by $\Delta$, and the fiber length (km) by Li (S1053).

$$Di(\lambda j)=\{\Delta \times (\lambda j-\lambda x)+Di(\lambda x)/Li\}\times Li$$

In the description above, we used the representative dispersion value Di ($\lambda x$) at the representative wavelength of the transmission fiber ($\lambda x$), and the fiber length Li as information for identifying the transmission fiber. However, the fiber dispersion amount at the desired wavelength Di (λj) can be computed by using the zero dispersion wavelength in the transmission fiber (λ0j) in the place of the representative dispersion value Di (λx) at the representative wavelength (λx). In this case, the process can be expressed by the following equation when the desired wavelength (nm) is represented respectively by λj, the zero dispersion wavelength of the transmission fiber by λ0i, the fiber dispersion amount (ps/nm) at the desired wavelength by Di (λj), the dispersion slope value (ps/nm/nm/km) by Δ, and the fiber length (km) by Li (S1053):

$$Di(\lambda j)=\{\Delta \times (\lambda j - \lambda 0)\} \times Li$$

Then, FIG. 8 (b) is a flowchart for seeking the dispersion amount of the DCF.

The processor (23-1) acquires the standardized dispersion amount for each signal wavelength corresponding to DCFi (i=1, 2, ... ) from the dispersion data table (21-1) (S1131). If there are more than one type of DCF, the type number should be added to the index of the dispersion data table (21-1) for the convenience of searching the dispersion data table (21-1), and the processor (23-1) acquires the value of the corresponding standardized dispersion amount. This process is expressed by the following equation when the desired wavelength (nm) is represented respectively by λi, the dispersion amount (ps/nm) at the desired wavelength by di(λj), the dispersion amount at the representative wavelength (nm) by λx and the standardized dispersion amount (ps/nm) at the desired wavelength by ds(λj) (S1133):

$$di(\lambda j) = di(\lambda x)/ds(\lambda x) \times ds(\lambda j)$$

All the variable dispersion compensators are set at an adequate dispersion amount by repeating the flow described above with regards to the wavelength λj for all the wavelengths (λ1, λ2, ... ).

(5) Model Example

Figure 9:
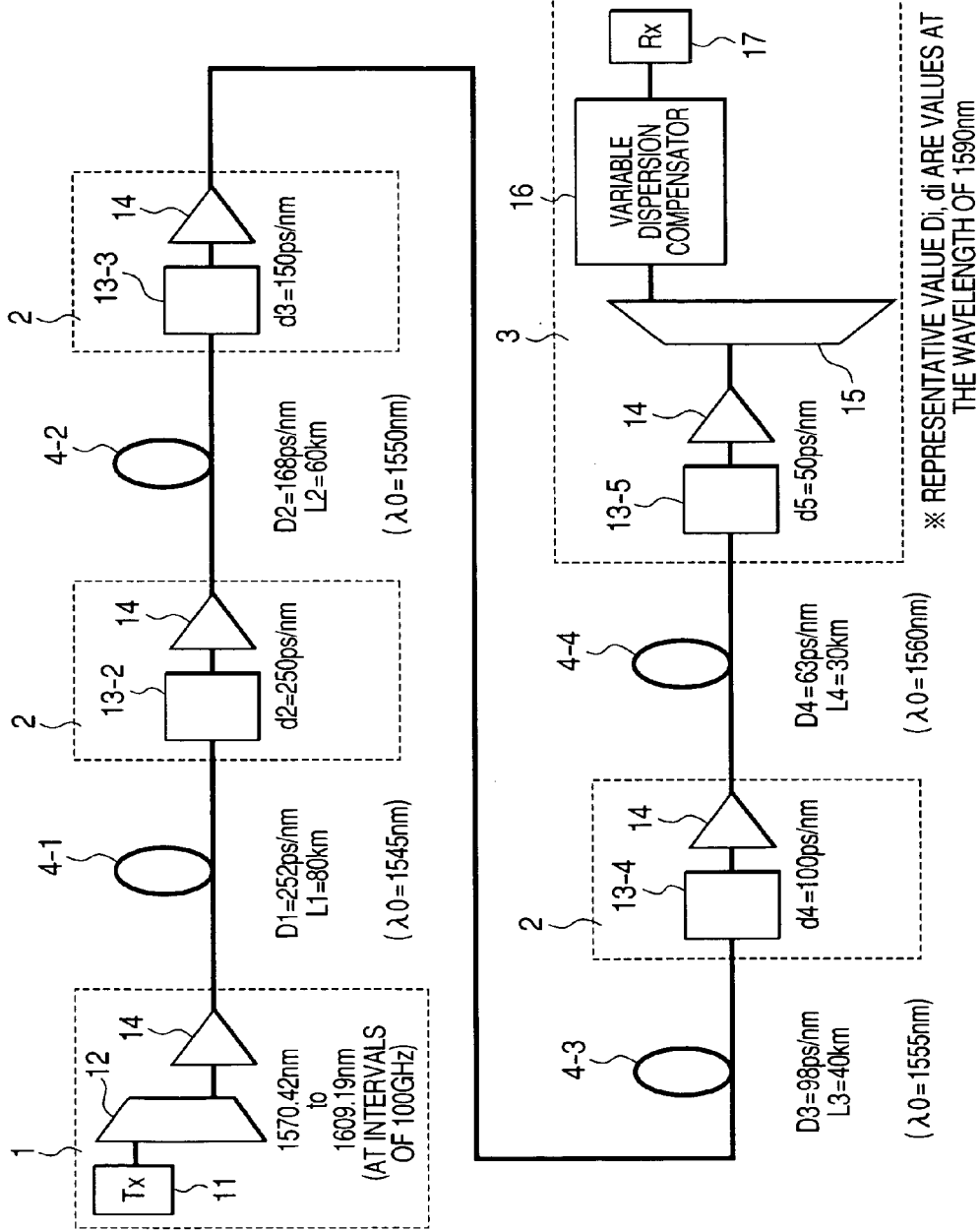
FIG. 9 is an example of a model of WDM transmission system.

FIG. 9 shows a system model example of the WDM transmission system.

We actually computed the dispersion compensation amount by using the mode illustrated below.

According to the computation model shown, we arranged the WDM signal at the intervals of 100 GHz with the transmission wavelength of 1,570.42 nm to 1,609.19 nm and chose the representative wavelength of 1550 nm at the center of the waveband. The representative dispersion value (D1, D2, D3, and D4) and fiber length (L1, L2, L3, and L4) of each fiber by 4-span transmission is as shown in FIG. 9. DCFs (13) are laid on a plurality of WDM relays (2) and WDM receivers (3). The type of DCF is limited to one, and the representative dispersion value is respectively set at 250, 150, 100 and 50 ps/nm by adjusting the length of the DCF. We used the table shown in FIG. 6 for the dispersion data table in the control circuit.

FIG. 10 shows examples of computing the dispersion compensation amount in the WDM transmission system models.

By the process described above, we induced the dispersion amount for each wavelength of the transmission fiber shown in FIG. 10 (a), the dispersion amount for each wavelength of the DCF shown in FIG. 10 (b) and finally induced the set value for the variable dispersion compensator for each wavelength shown in FIG. 10 (c). This set value is the value for 100% compensation. The set value of dispersion varies between approximately −40 ps/nm and approximately +40 ps/nm depending on the wavelength, and the table shows that this control can compensate the compensation errors of the dispersion slope value by the DCF.

As described above, it will be possible to control with a low-cost configuration and at a high speed the residual dispersion wavelength dependency that cannot be completely compensated even by the fixed dispersion compensators based on the input of dispersion characteristic at the representative wavelength in the transmission line and the DCF and the fiber length of the transmission line, using at the same time the dispersion wavelength dependency characteristic recorded in advance in the control circuit, by computing the dispersion compensation amount and controlling the variable dispersion compensator.

2. The Second Embodiment (1) WDN Transmission System

Figure 11:
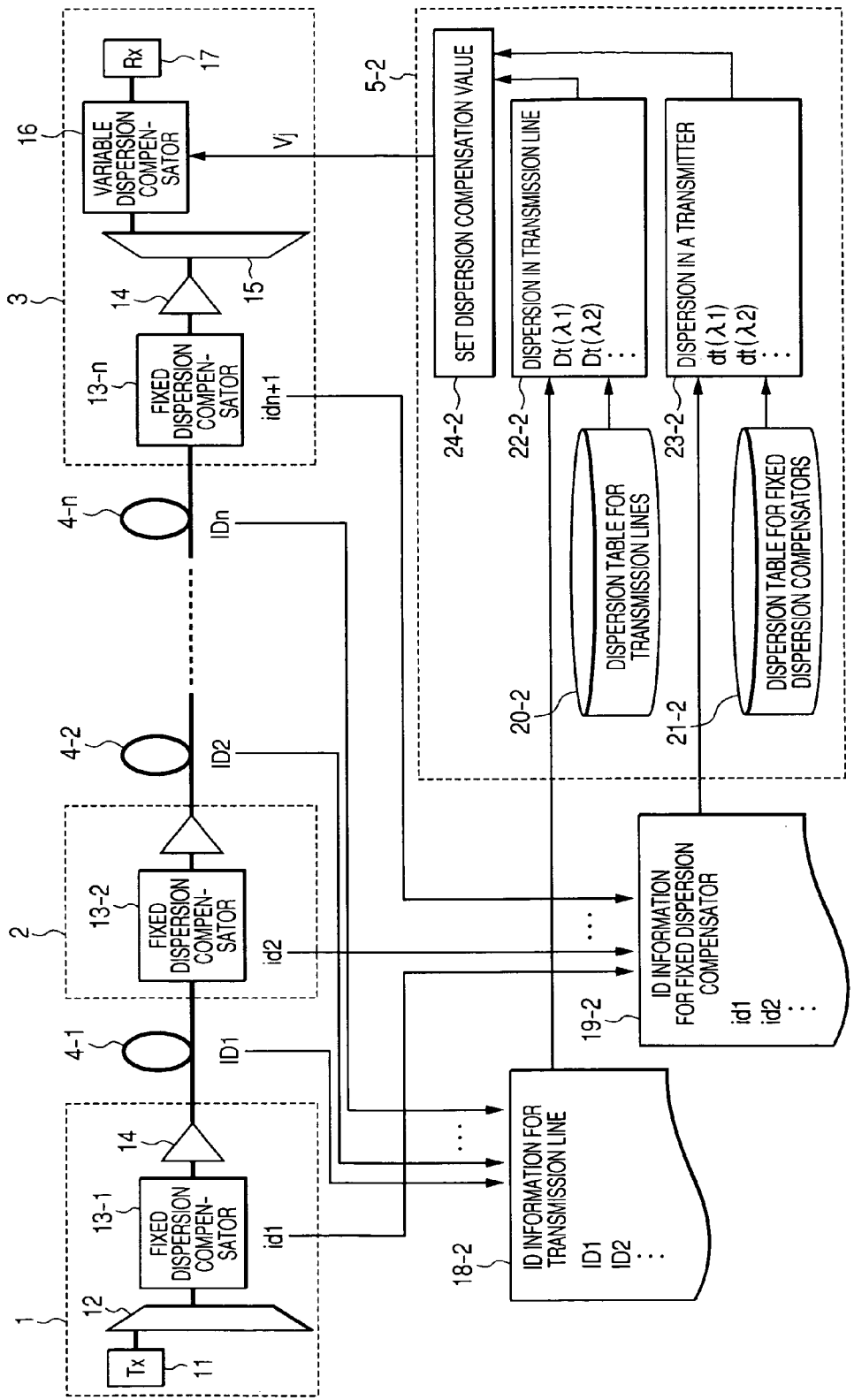
FIG. 11 is a block diagram showing the configuration of the second embodiment of the WDM transmission system.

FIG. 11 is a block diagram showing the configuration of the second embodiment of the WDM transmission system.

We will describe below the second embodiment of the present invention.

The WDN transmission system that we propose includes a WDM transmitter (1), a WDM relay (2), a WDM receiver (3), a control circuit (5-2) and respective fibers (4-1, 2, ... n). The configuration of a WDM transmitter (1), a WDM relay (2), a WDM receiver (3) is similar to the first embodiment. The control circuit (5-2) is provided with a processor (22-2) for computing the dispersion amount in the transmission lines and the processor (23-2) for computing the dispersion amount of the fixed dispersion compensators. Each processor (22-2) and (23-2) is connected with a storage area, and in each storage area the dispersion data table (20-2) in the transmission lines and the dispersion data table (21-2) of the fixed dispersion compensators are controlled.

In the second embodiment, the ID information (ID1, ID2, ... ) of the transmission lines (4-1, 2, ... ) is used as the identification information (18-2) of transmission lines. And the ID information (id1, id2, ... ) of the fixed dispersion compensators is used as the identification information of fixed dispersion compensators (19-2).

The processor (22-2) computes the dispersion amount in the transmission lines (4-1, 2, ... ) for each wavelength of the WDM signals based on the inputs of the ID information (ID1, ID2, ... ) of the transmission lines (4-1, 2, ... ) and the simultaneous use of the dispersion data table (20-2) of the transmission lines (for example, dispersion wavelength dependency characteristics). Similarly, the processor (23-2) computes the dispersion amount of fixed dispersion compensators (13-1, 2, ... ) at each wavelength of the WDM signal based on the inputs of ID information (id1, id2, ... ) of fixed dispersion compensators (13-1, 2, ... ) and using at the same time the dispersion data table of the fixed dispersion compensators (21-2) (for example, dispersion wavelength dependency characteristic).

The dispersion amount compensation setting circuit (24-2) computes, in the same way as the embodiment 1, the set amount of dispersion of the variable dispersion compensator (16) for each wavelength of the WDM signals based on the dispersion amount acquired by the processor (22-2) and the processor (23-2). And it sends out the dispersion control signal (control voltage) at each wavelength as shown in FIG. 2 to the variable dispersion compensator (16) so that the dispersion amount of the variable dispersion compensator (16) may be actually the computed set amount of dispersion to be controlled. Incidentally, we will describe further below the computing method of the accumulated dispersion amount.

(2) Dispersion Data Table

FIG. 12 shows an example of the dispersion data table (20-2) of transmission lines and the dispersion data table (21-2) if fixed dispersion compensators in the embodiment 2.

As FIG. 12 (a) shows, the dispersion table of transmission lines (20-2) records the dispersion amount for each signal wavelength ($\lambda 1, \lambda 2, \ldots$) by taking the ID information (ID1, ID2, ...) of the transmission fiber as indices. This table may record zero-dispersion wavelength and fiber length as reference data, but in this case where this table stores dispersion amount itself, these items may not be essential.

And as FIG. 12 (b) shows, the dispersion data table (21-2) for the fixed dispersion compensators records dispersion amounts for each signal wavelength ($\lambda 1, \lambda 2, \ldots$) by taking the ID information of the fixed dispersion compensators (id1, id2, ...) as indices. This table records dispersion amounts for values of ITU grid wavelength between 1,570.42 nm and 1,609.19 nm for example. However, a grid different from the WDM signal wavelength such as 1,570 nm, 1,571 nm, ... may be used, and the dispersion amount can easily be estimated by linear interpolation. For example, if a dispersion amount of −60 ps/nm at 1,570 nm, and a dispersion amount of −61 ps/nm at 1,571 nm are registered in the table, it is possible to convert by linear interpolation the dispersion amount at the wavelength $\lambda 1$ (1,570.42 nm) to be −60. 42 ps/nm.

(3) Computing Processing of Dispersion Compensation Amount

Figure 13:
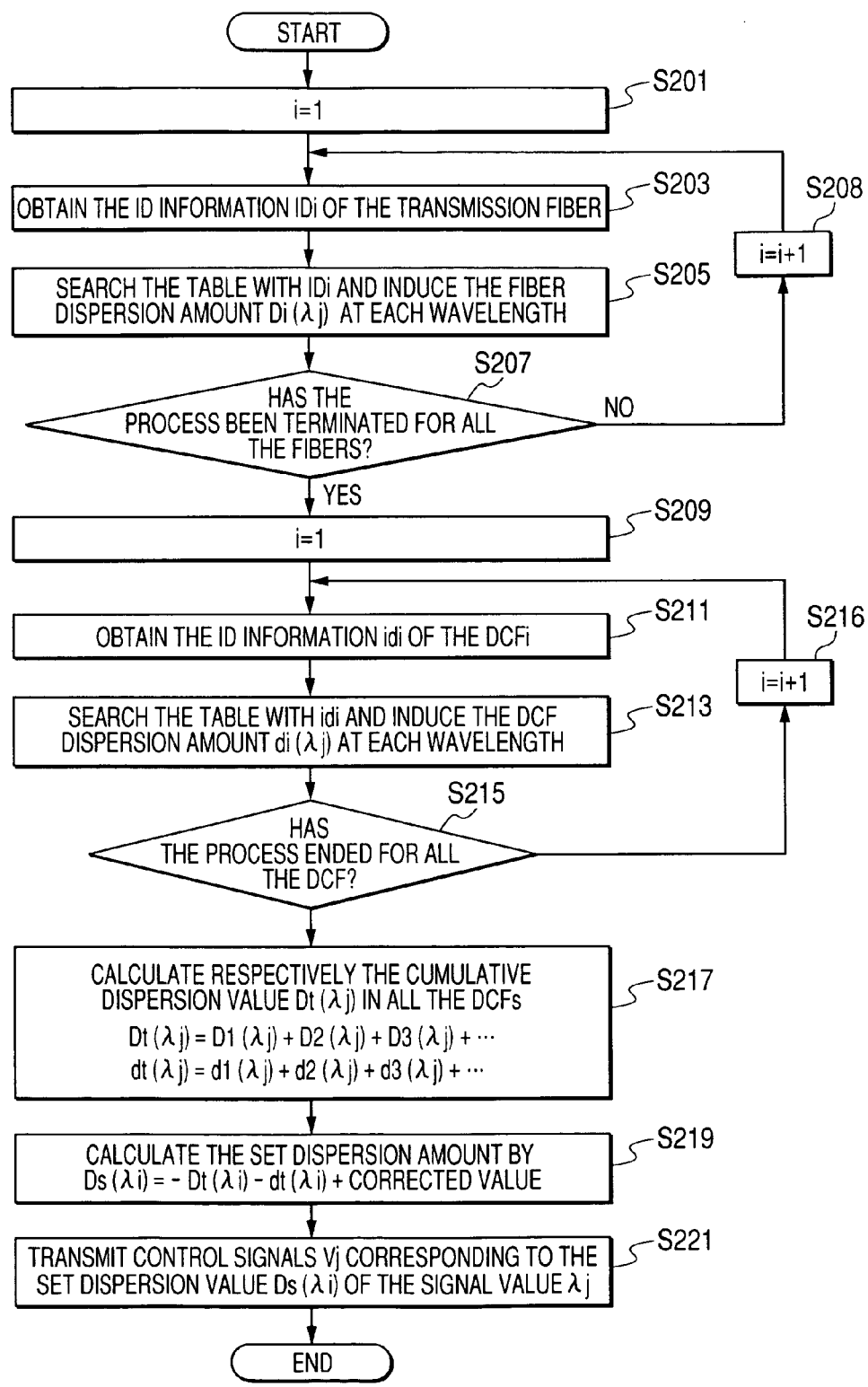
FIG. 13 is a flowchart showing the process of computing dispersion compensation amount in the second embodiment.

FIG. 13 is a flowchart showing the process of computing dispersion compensation amount (set amount of dispersion) in the second embodiment.

In the first place, the processor (22-2) of the control circuit (5-2) sets the initial value (for example, i=1) as the information for identifying transmission fibers i (i=1, 2, ...) (S201).

And the processor (22-2) acquires the ID information IDi of the transmission fibers i (S203). Such information may be acquired by manually inputting the actual ID information in the control circuit (5-2), or indirectly inputting the same by using a memory or a communication line. Or a map for controlling the connection condition of the fibers may be created in the WDM transmission system management system, from which the ID information may be transferred to the control circuit (5-2). Or, the ID information of the fibers connected may be controlled from the WDM relay side, and it may be transferred from the WDM relay (2) to the control circuit (5-2) through the management system communication line and communication network.

Then, the processor (22-2) searches the dispersion data table (20-2) by taking the ID information IDi of the transmission fibers i that the processor (22-2) had acquired in the step S203 as index to acquire the dispersion amount Di ($\lambda$j) (j=1, 2, ...) of the transmission fibers i for each signal wavelength $\lambda$j ($\lambda 1, 2, \ldots$). (S205).

Then, the processor (22-2) judges whether the acquisition of information on dispersion amount corresponding to all the transmission fibers i (i=1, 2, ...) (4-1, 2, ... has been completed or not (S207), and if it has not been completed, the processor adds up the value of i (for example, i=i+1) (S208), and the processor acquires the dispersion amount Di ($\lambda$j) ((i=1, 2, ...), (j=1, 2, ...) for each wavelength of all the transmission fibers by the steps S203 and S205.

Then, the processor (23-2) of the control circuit (5-2) sets initial values (for example, i=1) as information for identifying DCFi (i=1, 2, ...) (S209). And the processor (23-2) acquires the ID information idi of the DCFi (S211). Such information may be acquired by manually inputting the actual representative dispersion value of the DCF installed in the control circuit (5-2), or by indirectly inputting the same by using memory or communication circuit. Or the representative dispersion value may be stored in the DCF module itself, and when the DCf module is added on the apparatus rack, it may be automatically notified to the control circuit (5-2) through the control system. Or in the same way as the transmission fiber, a map for managing the laid out condition of the DCF may be created in the WDM transmission system management system, and the ID information may be transferred from there to the control circuit (5-2).

Then, the processor (23-2) searches the dispersion data table (20-2) by taking the ID information di of the DCFi that the processor (23-2) had acquired in the step S211 as indices to acquire the dispersion amount of the DCFi di($\lambda$j), (j=1, 2, ...) (13-1, 2, ...) for each signal wavelength $\lambda$ ($\lambda 1, \lambda 2, \ldots$). (S213).

And the processor (23-2) judges whether the acquisition of information on dispersion amount corresponding to all the DCFi (i=1, 2, ...) has been completed or not (S215), and if it has not been completed, the processor adds up the value of i (for example, i=i+1) (S216), and the processor acquires the dispersion amount Di ($\lambda$j) ((i=1, 2, ...), (j=1, 2, ...) for each wavelength of all the DCF by the steps, S203 and S205.

Then, in the same way as the embodiment 1, the dispersion compensation setting circuit (24-2) computes the accumulated dispersion amount Dt($\lambda$j) for each wavelength $\lambda$j of the transmission fibers by adding up the fiber dispersion amount D1($\lambda$j), D2($\lambda$j), D3($\lambda$j) ... for all the fibers for each wavelength $\lambda$j. Similarly, the dispersion compensation setting circuit (24-2) adds up the dispersion amount of DCF d1($\lambda$j), d2($\lambda$j), d3($\lambda$j), ... for all the DCF for each wavelength $\lambda$j to compute the accumulated dispersion amount dt($\lambda$j) at each wavelength $\lambda$j in the DCF (S217). In the case of 100% compensation, it computes the set amount of dispersion for each wavelength in DCF $\lambda$j Ds($\lambda$j) of the variable dispersion compensator (16) by −Dt($\lambda$j)−dt($\lambda$j) (S219). Depending on the circumstance, in order to improve transmission characteristic, an undercompensation or an overcompensation may be effectuated by adding a correction value to this.

Then, the dispersion compensation setting circuit (24-2) sends the dispersion control signals Vj corresponding to the computed set amount of dispersion Ds($\lambda$j) back to the variable dispersion compensator (16) to control in such way that the dispersion amount of the variable dispersion compensator (16) may be Ds($\lambda$j) (S221).

By repeating the flow as described above with regards to the wavelength $\lambda$j for all the wavelengths ($\lambda$=1, 2, ...), all the variable dispersion compensators are set at a suitable dispersion amount.

As described above, it will be possible to control with a low-cost configuration and at a high speed the wavelength dependency of the residual dispersion that cannot be completely compensated even by fixed dispersion compensators by searching and picking up the dispersion wavelength dependency recorded in advance in the control circuit by taking the ID information of the transmission lines and the DCF as the indices, computing the dispersion compensation amount (set amount of dispersion) and controlling the variable dispersion compensators.

3. The Third Embodiment

(1) WDM Transmission System

Figure 14:
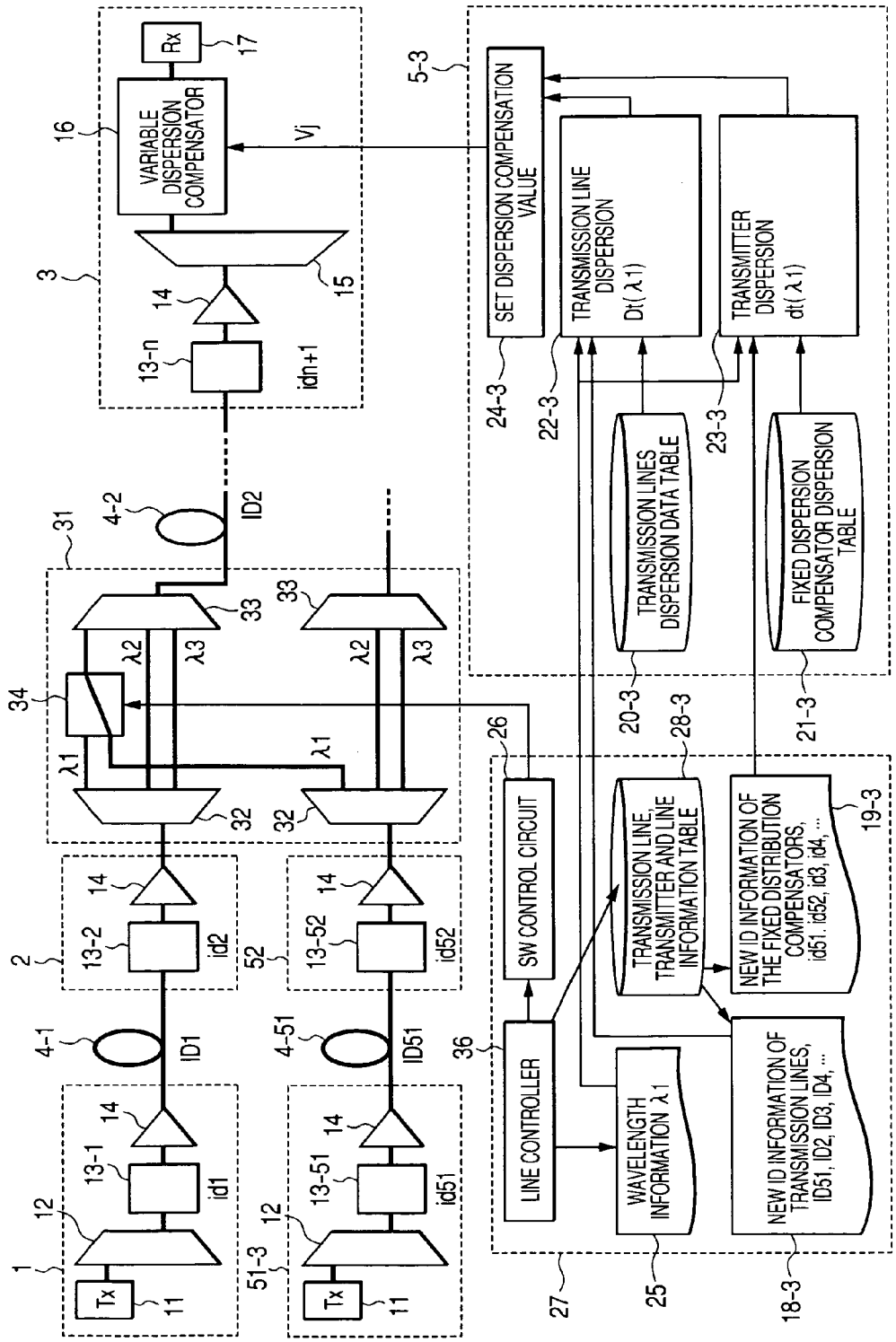
FIG. 14 is a block diagram showing the configuration of the third embodiment of the WDM transmission system.

FIG. 14 is a block diagram showing the configuration of the third embodiment of the WDM transmission system.

We will describe below the third embodiment of the present invention.

The WDM transmission system includes a WDM transmitter (1) and a WDM transmitter (51-3), a WDM relay (2) and a WDM relay (52), an optical cross-connect (31), a WDM receiver (3), a control circuit (5-3), a switch controller (27) and respective fibers (4-1, 2, . . . ) and (4-51). The configuration of a WDM transmitter (1), a WDM relay (2), a WDM receiver (3) is similar to the first and the second embodiments. The WDM transmitter (51-3) includes an optical transmitter (11), a multiplexer (12), a fixed dispersion compensator (13-51), and an optical amplifier (14). The control circuit (5-3) is provided with a processor (22-3) for computing the dispersion amount in the transmission lines and the processor (23-3) for computing the dispersion amount of the fixed dispersion compensators. Each processor (22-3) and (23-3) is connected with a storage area, and in each storage area the dispersion data table (20-3) in the transmission lines and the dispersion data table (21-3) of the fixed dispersion compensators are controlled.

The optical cross-connect (31) includes a demultiplexer (32), a multiplexer (33) and an optical switch (34). The optical cross-connect (31) internally cross-connects the WDM signal that has come through the WDM transmitter (1), the optical fiber (4-1), and the WDM relay (2) and the WDM signal that has come through the WDM transmitter (51-3), the optical fiber (4-51) and the WDM relay (52) by the block of wavelength. Specifically, for example, two WDM signals are respectively demultiplexed by the demultiplexer (32) for each wavelength (in this case, λ1, λ2, λ3) before reaching the optical switch (34). The optical switch (34) selects the signal λ1 that has come through the WDM transmitter (1), the optical fiber (4-1), and the WDM relay (2) or the signal λ1 that has come through WDM transmitter (51-3), the optical fiber (4-51), and the WDM relay (52). The signal λ1 selected by the optical switch (34) is reconverted into WDM signal by the multiplexer (33) to be sent out to the fiber (4-2). With regards to the internal structure of the optical cross-connect (31), a variety of forms are possible, and the structure shown in FIG. 14 is only an example. The structure of the optical cross-connect does not limit the configuration of this embodiment, and this embodiment does not rely on the structure of the optical cross-connect and is adaptable. In addition, the optical cross-connect (31) is controlled by the switch controller (27).

The switch controller (27) includes a switch control circuit (26), a route manager (36), and a route information table (28-3). The route manager (36) controls the state of the optical switch (34) through the SW control circuit (26). And the route manager (36) manages the route information before and after the switching of the optical switch (34) in a table (28-3).

In the third embodiment, after switching by the optical switch (34), the new ID information on the transmission lines (in this case, ID 51, ID2, ID3, ID4, . . . ) corresponding to the new transmission routes is used as the identification information of the transmission lines (18-3), and after the switching of the optical switch (34), the new ID information of fixed dispersion compensators (in this case, id51, id52, id3, id4 . . . ) corresponding to the new transmission routes is used as the identification information of the fixed dispersion compensators (19-3).

Figures 15, 16:
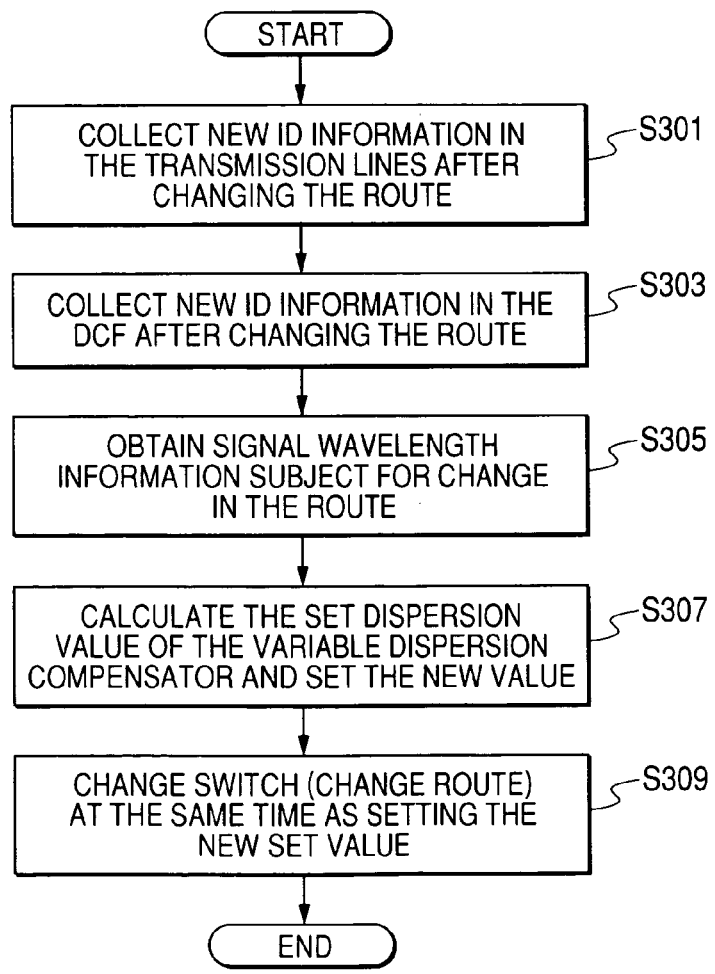
FIG. 15 is a descriptive route information table according to the third embodiment.
FIG. 16 is a flowchart describing the control process according to the third embodiment.

FIG. 15 shows an example of route information table.

The route information table (28-3) is, for example, a table as shown. The route information table (28-3) before the switching of the optical switch (34) records that the transmission fibers ID1, ID2, . . . , IDn, and the DCFs id1, id2, id3, . . . idn+1 are on the route. On the other hand, the route information table (28-3) after the switching of the optical switch (34) records that the transmission fibers ID51, ID2, . . . , IDn, and the DCFs id51, id52, id3, . . . idn+1 are on the route.

The route manager (36) acquires the new ID information of transmission lines (18-3) corresponding to the new transmission route after the switching of the optical switch (34), the new ID information of fixed dispersion compensators (19-3) corresponding to the new transmission route and the wavelength information (25) of the signals switched by the optical switch (34) from the route information of this route information table (28-3). Such information is transferred to the control circuit (5-3) of the variable dispersion compensator to be used for computing the appropriate set amount of dispersion of the variable dispersion compensator (16).

(2) Control Processing of Route Switching

FIG. 16 is a flowchart showing the control process in the third embodiment.

As a premise, this is before the switching of the route (in the case shown in the figure, the input of the optical switch (34) is connected upward), and according to the second embodiment, let us assume that the dispersion compensation setting circuit (24-3) of the control circuit (5-3) controls the dispersion setting amount of the variable dispersion compensator (16). When the switch controller (27) switches the route at the predetermined time or according to the predetermined instruction in this state, the route manager (36) searches the route information table of transmission lines and transmission devices (28-3) to acquire the new ID information of transmission fibers (18-3) in the new transmission route after the switching of route (S303). Similarly, the route manager (36) acquires the new ID information (19-3) of fixed dispersion compensators in the new transmission route after the switching of route (S308). And the route manager (36) acquires the signal wavelength information (25) subject to the route switching (in this case, the signal wavelength information is represented by λ1) (S305). The route manager (36) transfers the new ID information of transmission fibers (18-3), the new ID information of fixed dispersion compensators (19-3) and the signal wavelength information (25) to the control circuit (5-3) of the variable dispersion compensator.

The control circuit (5-3) of the variable dispersion compensator computes the accumulated dispersion of the transmission lines and the accumulated dispersion of the transmitter for the wavelength prescribed by the given signal wavelength information following the flowchart (FIG. 11) that we described in the second embodiment (S307). In this case, it computes respectively Dt(λ1), dt(λ1) and Ds(λ1).

The control circuit (5-3) of the variable dispersion compensator and the switch controller (27) proceeds to cooperative control, and at the same time or after (including immediately after) the dispersion compensation setting circuit (24-3) of the control circuit (5-3) sets the new set amount of dispersion Ds(λ1) in the variable dispersion compensator (16), the route manager (36) of the switch controller (27) switches the optical switch (34) by the operation of the SW control circuit (26) (S309).

As described above, by searching and extracting the dispersion wavelength dependency characteristic recorded in advance in the control circuit by taking the ID information of the transmission lines and DCFs as indices, computing the dispersion compensation amount (set amount of dispersion) and cooperatively controlling the optical cross-connect and the variable dispersion compensator, it will be possible to control by a low-cost configuration and at a high speed the wavelength dependency of residual dispersion that cannot be completely compensated even by fixed dispersion compensators. And it will be possible to speed up the control of dispersion compensation amount (set amount of dispersion) during the switching of routes by the optical cross-connect, or in other words, it will be possible to shorten the communication disruption time resulting from the route switching by the optical cross-connect.

4. The Fourth Embodiment

(1) WDM Transmission System

Figure 17:
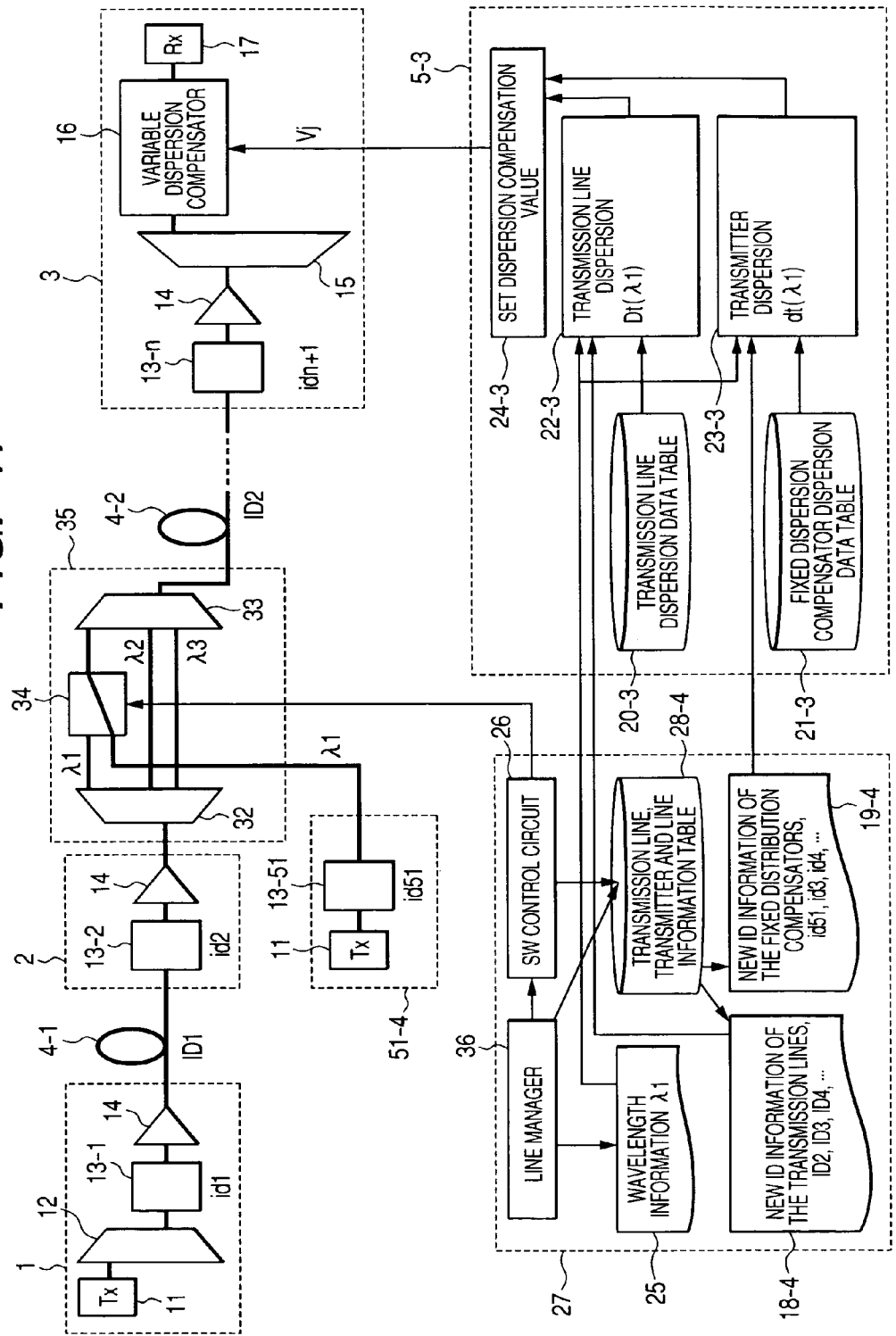
FIG. 17 is a block diagram showing the configuration according to the fourth embodiment of the WDN transmission system.

FIG. 17 is a block diagram showing the configuration of the fourth embodiment of the WDM transmission system. We will describe below the fourth embodiment of the present invention.

The WDM transmission system includes a WDM transmitter (1) and a WDM transmitter (51-4), a WDM relay (2), an optical add drop multiplexer (35), a WDM receiver (3), a control circuit (5-3), a switch controller (27) and respective fibers (4-1, 2 . . . ). The configuration of a WDM transmitter (1), a WDM relay (2), a WDM receiver (3) is similar to the first, the second and the third embodiments. The WDM transmitter (51-4) includes an optical transmitter (11), and a fixed dispersion compensator (13-51).

The control circuit (5-3) is similar to the third embodiment.

The optical add drop multiplexer (35) includes a demultiplexer (32), a multiplexer (33) and an optical switch. The optical add drop multiplexer (35) internally adds signals sent by the WDM transmitter (51-4) into the WDM signals that have come from the WDM transmitter (1) through the optical fibers (4-1) and the WDM relay (2). With regards to the internal structure of the optical add drop multiplexer (35), a variety of forms are possible, and the structure shown in FIG. 17 is only an example. The structure of the optical add drop multiplexer does not limit the configuration of this embodiment, and the configuration of this embodiment does not depend on the structure of the optical add drop multiplexer and is adaptable. And the optical add drop multiplexer is controlled by the switch controller (27).

The switch controller (27) includes a switch control circuit (26), a route manager (36), and a route information table (28-4). The structure of the switch controller (27) is similar to the third embodiment, except that the data stored in the route information table (28-4) are different. The route manager (36) controls the state of the optical switch (34) through the SW control circuit (26). And the route manager (36) manages the route information before and after the switching of the optical switch (34) in the table (28-4). The route manager (36) acquires from the route information of this route information table (28) the new ID information (18-4) of transmission route corresponding to the new transmission routes after the switching of the optical switch (34), the new ID information (19-4) of fixed dispersion compensators corresponding to the new transmission routes, and the wavelength information (25) of the signals to be switched by the optical switch (34).

According to the fourth embodiment, in the same way as the third embodiment, the new ID information of transmission route corresponding to the new transmission route (in this case, ID2, ID3, ID4 . . . . . . ) after the switching of the optical switch (34) is used as the identification information (18-4) of transmission route, and the new ID information (in this case, id51, id3, id4, . . . ) of fixed dispersion compensators corresponding to the new transmission routes is used as the new identification information of transmission routes corresponding to the new transmission routes after the switching of the optical switch (34) is used as the new identification information (19-4) on the fixed dispersion compensators.

(2) Control Processing of Switching Routes

According to the fourth embodiment, in the same way as the configuration of the third embodiment and the flowchart of the third embodiment, the variable dispersion compensators (16) are controlled.

As a premise, let us suppose that the dispersion compensation setting circuit (24-3) of the control circuit (5-3) controls the set amount of dispersion of the variable dispersion compensator (16) according to the second embodiment. In this state, when the switch controller (27) switches the routes at the predetermined time or according to the predetermined instruction, the route manager (36) searches the route information table (28) of transmission lines and transmission devices, and acquires the new ID information (18-4) of the transmission fibers in the new transmission routes after the switching of routes. Similarly, the route manager (36) acquires the new ID information (19-4) of the fixed dispersion compensators in the new transmission route after the switching of routes. Moreover, the route manager (36) acquires signal wavelength information (25) (in this case, signal wavelength information $\lambda 1$) subject to the switching of routes. The route manager (36) transfers such new ID information (18-4) of the transmission fibers, the new ID information (19-4) of fixed dispersion compensators and the signal wavelength information (25) to the control circuit (5-3) of the variable dispersion compensators (18).

The control circuit of the variable dispersion compensator computes the accumulated dispersion of transmission lines and accumulated dispersion of transmission devices for the wavelength determined by the signal wavelength information given and computes the new set amount of dispersion according to the flowchart (FIG. 13) described in the second embodiment. In this case, it computes respectively $Dt(\lambda 1)$, $dt(\lambda 1)$, and $Ds(\lambda 1)$.

The control circuit (5-3) of the variable dispersion compensator and the switch controller (27) proceeds to cooperative control, and at the same time or after (including immediately after) the dispersion compensation setting circuit (24-3) of the control circuit (5-3) sets the new set amount of dispersion $Ds(\lambda 1)$ in the variable dispersion compensator (16), the route manager (36) of the switch controller (27) switches the optical switch (34).

As described above, by searching and extracting the dispersion wavelength dependency characteristic recorded in advance in the control circuit by taking the ID information of the transmission lines and DCFs as indices, computing the dispersion compensation amount (set amount of dispersion) and cooperatively controlling the optical add drop multiplexer and the variable dispersion compensator, it will be possible to control by a low-cost configuration and at a high speed the wavelength dependency of residual dispersion that cannot be completely compensated even by fixed dispersion compensators. And it will be possible to speed up the control of dispersion compensation amount (set amount of dispersion) during the switching of routes by the optical add drop multiplexer, or in other words, it will be possible to shorten the communication disruption time resulting from the route switching by the optical add drop multiplexer.

5. Variation of Each Embodiment

Regarding the third and fourth embodiments, the signal wavelength information (25) may include a plurality of wavelengths. In this case, the optical switch (34) switches the route for such plurality of wavelengths. In this case, the route information table (28-3) or (28-4) stores respectively the route information (ID information) before and after the switching for each wavelength $\lambda 1, \lambda 2, \ldots$. The route manager (36) transfers such route information (ID information to the control circuit (5-3). In the step S307, the control circuit (5-3) computes the accumulated dispersion for the transmission lines $Dt(\lambda 1), Dt(\lambda 2), \ldots$ and the accumulated dispersion for the transmission devices $dt(\lambda 1), dt(\lambda 2), \ldots$, and computes the new set amount of dispersion $Ds(\lambda 1), Ds(\lambda 2), \ldots$ for a plurality of wavelengths $\lambda 1, \lambda 2, \ldots$, and controls the variable dispersion compensator (16) for such plurality of wavelengths.

And for the plurality of wavelengths, all the wavelengths may be included.

If the optical switch (34) or the optical add drop multiplexer (35) is constructed so that all the wavelengths $\lambda 1, \lambda 2, \lambda 3 \ldots$ are switched, the signal wavelength information (25) needs not be used. In that case, the step S305 may be omitted, and in the step S307, the accumulated dispersion of the transmission lines and the accumulated dispersion of the transmission devices are computed based on the ID information of the transmission lines and the ID information of the transmission devices according to the flowchart described in the second embodiment (FIG. 13).

And in the embodiment described above, we computed the accumulated compensation amount for all the optical fibers and the DCFs laid on the transmission route from the transmission side to the receiving side. However, instead of computing all, it is possible to compute only the accumulated compensation of the predetermined optical fibers and DCFs or the predetermined portion thereof. In that case, for example, the data of specific optical fibers and DCFs or any specific portion thereof may be inputted or stored in the control circuit (5-1)-(5-3) or the switch controller (27), and when the control circuit (5-1)-(5-3) computes the accumulated total, the data may be used.

Figure 18:
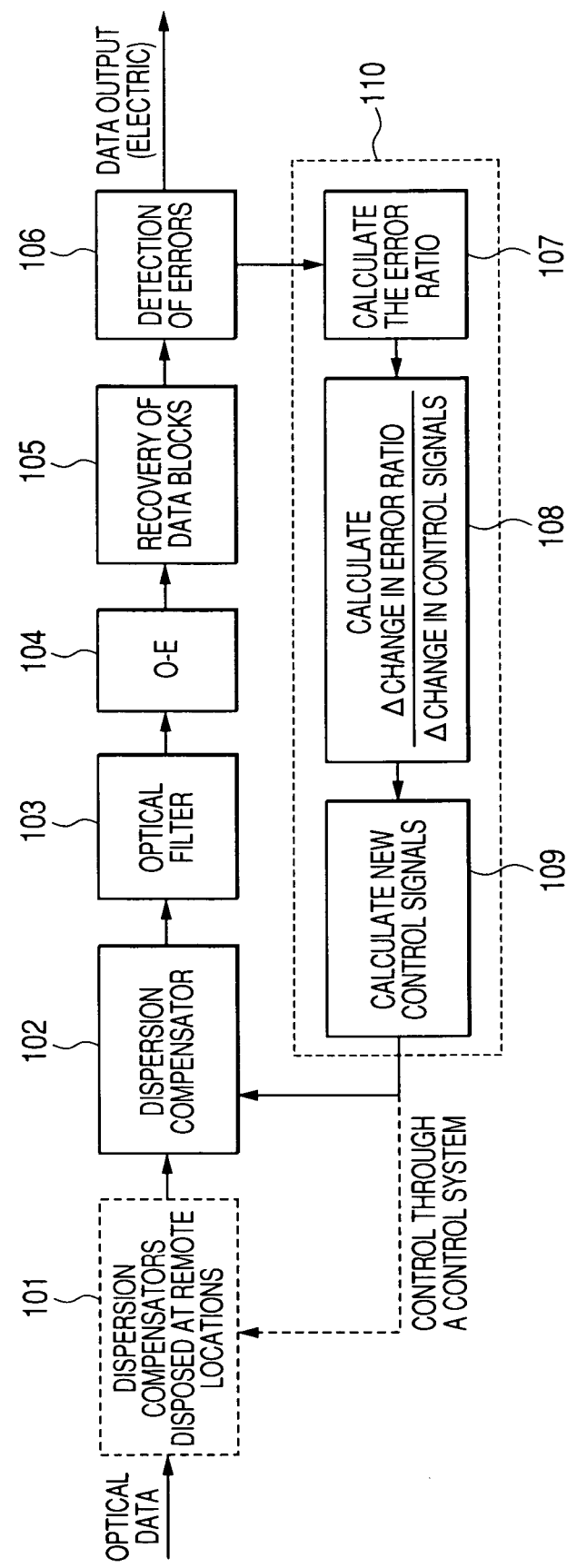
FIG. 18 is a block diagram showing the control configuration of the prior variable dispersion compensator.

It is effective to use both the traditional feedback-type adaptive control as shown in FIG. 18 and the control in this embodiment by taking advantage of the high-speed control in this embodiment. In other words, the problem of much start-up time required in the traditional feedback-type adaptive control can be solved, by setting the set amount of dispersion compensation acquired by the process in this embodiment as the initial value for the control of the variable dispersion compensator, and thereafter by proceeding to a feedback-type adaptive control. In this case, for example, a feedback-type adaptive control circuit for controlling adaptively the variable dispersion compensator (16) may be separately provided by using the result of optical output signals from the variable dispersion compensator (16), or by using the result of electric output signals resulting from the photoelectric conversion of the optical output signal, and the feedback-type control circuit may be operated by choosing the dispersion amount set by the control circuit (5-1)-(5-3) as the initial value of the variable dispersion compensator (16).

And it is effective to combine the present embodiment with a modulation system of wide dispersion tolerance such as optical duobinary, M-ary phase shift keying of three value or more and the like. In other words, by adopting the present embodiment, it will be possible to construct a low-cost system wherein, because the static 100% dispersion compensation can be easily realized, the adaptive control on the receiver side is made unnecessary by absorbing changes in dispersion resulting from temperature change of fibers and dynamic changes in dispersion resulting from fluctuation of wavelength by the dispersion tolerance on the modulation system side.

The present invention can be used in transmission systems using wavelength division multiplex (WDM) of various forms and net.

What is claimed is:

1. A WDM (Wavelength Division Multiplex) transmission system comprising:

a plurality of fixed dispersion compensators of which the dispersion amount is fixed;

a plurality of optical transmission lines for connecting said fixed dispersion compensators one to another;

a variable dispersion compensator of which the dispersion amount is variable for controlling the dispersion amount of the optical signals received through said plurality of fixed dispersion compensators and said plurality of optical transmission lines for controlling the dispersion amount in response to the optical signals received; and a control circuit comprising further a transmission line dispersion table storing the information of dispersion wavelength dependency characteristic of said optical transmission lines and a compensator dispersion table storing the information of dispersion wavelength dependency characteristic of said fixed dispersion compensators and for controlling the dispersion amount of said variable dispersion compensator, wherein said control circuit acquires the information of each of said optical transmission lines and the information of each of said fixed dispersion compensators, computes the accumulated dispersion amount for each wavelength in said optical transmission lines and said fixed dispersion compensators by referring said transmission line dispersion table and compensator dispersion table, and controls the dispersion amount for each wavelength of said variable dispersion compensator based on the accumulated dispersion amount computed.

2. A WDM transmission system comprising:

a plurality of fixed dispersion compensators of which the dispersion amount is fixed;

a plurality of optical transmission lines for connecting said fixed dispersion compensators one to another;

a variable dispersion compensator of which the dispersion amount is variable for controlling the dispersion amount of the optical signals received through said plurality of fixed dispersion compensators and said plurality of optical transmission lines; and a control circuit comprising further a transmission line dispersion table storing the dispersion slope value of said optical transmission lines and a compensator dispersion table storing the standardized dispersion amount of said fixed dispersion compensators for each wavelength of a plurality of wavelengths including specified wavelength and for controlling the dispersion amount of said variable dispersion compensator wherein said control circuit acquires the dispersion amount at specified wavelength and fiber length of each of said optical transmission lines, seeks dispersion slope values by said transmission line dispersion table, computes the dispersion amount for each wavelength based on the dispersion slope value and the dispersion amount for said optical transmission line, acquires the specified dispersion amount at the specified wavelength of said fixed compensators, seeks the standardized dispersion amount for each wavelength from said compensator dispersion table, and computes the compensator dispersion amount for each wavelength based on the specified dispersion amount and the standard dispersion amount, computes the accumulated dispersion amount of transmission lines for each wavelength by adding said transmission line dispersion amount for each wavelength of all of, or specified ones or those chosen at specified interval of a plurality of said optical transmission lines from the transmission side to the receiving side, compute the accumulated dispersion amount of compensators by adding said compensator dispersion amount for each wavelength of all of, or specified ones or those chosen at specified interval of a plurality of said fixed dispersion compensators from the transmission side to the receiving side, and computes the set dispersion amount for each wavelength of said variable dispersion compensator by using the sum of the accumulated dispersion amount of the transmission lines and the accumulated dispersion amount of the compensators, or the corrected value of this value and controls the dispersion amount for each wavelength of said variable dispersion compensator based on the accumulated dispersion amount computed.

3. The WDM transmission system according to claim 2 wherein the transmission line dispersion amount Di ($\lambda$j) at the desired wavelength is computed by the formula:

$$Di(\lambda j)=\{\Delta \times (\lambda j-\lambda x)+Di(\lambda x)/Li\} \times Li$$

when the desired wavelength is represented by Di($\lambda$j), the specified wavelength by $\lambda$x, the dispersion amount in the transmission line at the specified wavelength by Di($\lambda$x), the dispersion slope by $\Delta$, and the fiber length by Li.

4. The WDM transmission system according to claim 2 wherein the transmission line dispersion amount Di (Aj) at the desired wavelength is computed by the formula:

$$Di(\lambda j)=\{\Delta \times (\lambda j-\lambda 0) \times Li$$

where the desired wavelength is represented by $\lambda$j, the zero dispersion wavelength in the optical transmission line by $\lambda 0i$, the dispersion slope by $\Delta$, and the fiber length by Li.

5. The WDM transmission system according to claim 2 wherein said compensator dispersion table records the standardized dispersion amount for each wavelength including the specified wavelength corresponding to the type of said fixed dispersion compensators, and said control circuit acquires said type in addition to the specified dispersion amount, searches said compensator dispersion table and acquires the value of the relevant standardized dispersion amount corresponding to the type.

6. The WDM transmission system according to claim 2 wherein the compensator dispersion amount di ($\lambda$j) at the desired wavelength is computed by the formula:

$$(\lambda j)=di(\lambda x)/ds(\lambda x) \times ds(\lambda j)$$

when the dispersion amount at the specified wavelength is represented by di ($\lambda$x), the standardized dispersion amount at the desired wavelength by di ($\lambda$j) and the standardized dispersion amount at the specified wavelength by di ($\lambda$x).

7. A WDM transmission system comprising:
a plurality of fixed dispersion compensators of which the dispersion amount is fixed;
a plurality of optical transmission lines for connecting said fixed dispersion compensators one to another,
a variable dispersion compensator of which the dispersion amount is variable for controlling the dispersion amount of the optical signals received through said plurality of fixed dispersion compensators and said plurality of optical transmission lines, and
a control circuit comprising further a transmission line dispersion table storing the dispersion amount for each wavelength of said optical transmission lines and a compensator dispersion table storing the dispersion amount for each wavelength for the identification information of said fixed dispersion compensators and for controlling the dispersion amount of said variable dispersion compensator wherein said control circuit
acquires the identification information of each of said optical transmission lines, searches said transmission line dispersion table based on the identification information regarding said optical transmission lines, and acquires the transmission line dispersion amount for each wavelength;
acquires the identification information of each of said fixed dispersion compensators, searches said transmission line dispersion table based on the identification information regarding said fixed dispersion compensator, and acquires the compensator dispersion amount for each wavelength;
computes the accumulated dispersion amount for the transmission lines for each wavelength by adding the dispersion amount for transmission line for all of them between, the predetermined ones or the ones between the predetermined positions from the transmission side to the receiving side among a plurality of said optical transmission lines,
computes the accumulated dispersion amount for the dispersion compensators for each wavelength by adding the fixed dispersion compensator dispersion amount for all of them between, the predetermined ones or ones between the predetermined positions from the transmission side to the receiving side among a plurality of said fixed dispersion compensators, and
computes the set amount of dispersion for each wavelength of said variable dispersion compensator by using the value acquired by adding the accumulated dispersion amount for transmission lines and the accumulated dispersion amount for compensators or the value acquired by correcting the same, and controls the dispersion amount for each wavelength by means of said variable dispersion compensator using said set value of dispersion.

8. A WDM transmission system according to claim 7 comprising:
an optical switch provided in the transmission line for exchanging, branching or inserting a part of or all the wavelength in the WDM signal;
a switch controller having a route information table storing the identification information of said plurality of optical transmission lines for the whole portion or the predetermined portion from the transmitting side to the receiving side before and after the switching of said optical switch, searching said route information table to acquire the new identification information of said optical transmission lines and the new identification information of said fixed dispersion compensators in the new transmission route after the switching of the route, and for controlling said optical switch,
wherein said control circuit acquires the new identification information of said optical transmission lines and the new identification information of said fixed dispersion compensators from said switch controller, and computes the accumulated dispersion amount of the transmission lines and the accumulated dispersion amount of the compensators based on such new identification information, and computes further new set amount of dispersion;

said control circuit controls the dispersion amount by giving the new set amount of dispersion to said variable dispersion compensator, and at the same time or thereafter said switch control circuit switches said optical switch.

9. The WDM transmission system according to claim 8 wherein said switch control circuit further acquires the wavelength information subject to the switching of route, and said control circuit further acquires said wavelength information from said optical switch control circuit, computes the accumulated dispersion amount of transmission lines and the accumulated dispersion amount of compensators and the new set amount of dispersion based on the new identification information of said optical transmission lines and the wavelength information of said fixed dispersion compensators.

10. The WDM transmission system according to claim 1, comprising further a feedback-type control circuit for adaptively control said variable dispersion compensator by using the optical output signal result of said variable dispersion compensator, or by using the electric output signal result acquired by photoelectric conversion of the optical output signal, wherein the set amount of dispersion set by said control circuit is used as the initial value of said variable compensator said feedback-type control circuit.

11. The WDM transmission system according to claim 1, wherein the optical duo-binary modulation system is used as the modulation system.

12. The WDM transmission system according to claim 1, wherein a m-ary phase shift keying system of three values or more is used.

* * * * *

UNITED STATES PATENT AND TRADEMARK OFFICE
CERTIFICATE OF CORRECTION

| | | |
|---|---|---|
| PATENT NO. | : 7,653,310 B2 | Page 1 of 1 |
| APPLICATION NO. | : 11/657004 | |
| DATED | : January 26, 2010 | |
| INVENTOR(S) | : Sekine | |

It is certified that error appears in the above-identified patent and that said Letters Patent is hereby corrected as shown below:

On the face of the patent, Under Item (73) please delete:

"Hitachi Communication Technologies, Ltd."

and <u>insert</u>:

-- Hitachi, Ltd. --

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,653,310 B2 | Page 1 of 1 |
| APPLICATION NO. | : 11/657004 | |
| DATED | : January 26, 2010 | |
| INVENTOR(S) | : Kenro Sekine | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Twenty-third Day of November, 2010

David J. Kappos
*Director of the United States Patent and Trademark Office*